US012049237B2

United States Patent
Yoshizawa

(10) Patent No.: US 12,049,237 B2
(45) Date of Patent: Jul. 30, 2024

(54) INFORMATION PROCESSING APPARATUS, AND INFORMATION PROCESSING METHOD, AND PROGRAM

(71) Applicant: Sony Group Corporation, Tokyo (JP)

(72) Inventor: Atsushi Yoshizawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 342 days.

(21) Appl. No.: 17/608,510

(22) PCT Filed: May 7, 2020

(86) PCT No.: PCT/JP2020/018543
§ 371 (c)(1),
(2) Date: Nov. 3, 2021

(87) PCT Pub. No.: WO2020/230693
PCT Pub. Date: Nov. 19, 2020

(65) Prior Publication Data
US 2022/0219732 A1 Jul. 14, 2022

(30) Foreign Application Priority Data
May 16, 2019 (JP) ................... 2019-092644

(51) Int. Cl.
*B60W 60/00* (2020.01)
*G08G 1/0968* (2006.01)
(52) U.S. Cl.
CPC ....... *B60W 60/0015* (2020.02); *G08G 1/0968* (2013.01); *B60W 2552/00* (2020.02); *B60W 2554/00* (2020.02); *B60W 2555/20* (2020.02)

(58) Field of Classification Search
CPC ......... B60W 60/0015; B60W 2552/00; B60W 2554/00; B60W 2555/20; G08G 1/0968
See application file for complete search history.

(56) References Cited

U.S. PATENT DOCUMENTS 10,042,359 B1 * 8/2018 Konrardy ........... G06Q 30/0284
2017/0356746 A1 12/2017 Iagnemma
2018/0113460 A1 * 4/2018 Koda ............... G08G 1/096838

FOREIGN PATENT DOCUMENTS

CN 105741595 A 7/2016
CN 107063287 A 8/2017
(Continued)

OTHER PUBLICATIONS

International Search Report and Written Opinion mailed on Aug. 11, 2020, received for PCT Application PCT/JP2020/018543, Filed on May 7, 2020, 9 pages including English Translation.

*Primary Examiner* — Tarek Elarabi
(74) *Attorney, Agent, or Firm* — XSENSUS LLP

(57) ABSTRACT

An information processing method, and a program that allow travelable areas to be appropriately selected according to performances, functions, and types of sensors that a vehicle includes, to realize appropriate automatic driving while avoiding critical states. Traveling possibility or impossibility information of every sensor category set according to types and performances of sensors with which vehicles are equipped, of a path of every area is acquired, and it is determined whether or not a route to a destination is most appropriate, on the basis of the sensor category of an own car, and the traveling possibility or impossibility information. If the route is not most appropriate, replanning is performed.

14 Claims, 14 Drawing Sheets

(56) References Cited

FOREIGN PATENT DOCUMENTS

| | | |
|---|---|---|
| CN | 107533794 A | 1/2018 |
| JP | 2017-62583 A | 3/2017 |
| WO | WO-2013069147 A1 | 5/2013 |
| WO | 2016/152873 A1 | 9/2016 |

* cited by examiner

FIG. 5

| SENSOR CATEGORY NUMBER | CORRESPONDING SENSOR |
|---|---|
| 1 | 360-DEGREE LiDAR, OMNIDIRECTIONAL RADAR, FORWARD AND BACKWARD CAMERAS |
| 2 | OMNIDIRECTIONAL RADAR, FORWARD AND BACKWARD CAMERAS |
| 3 | FORWARD CAMERA, FORWARD RADAR, SHORT-RANGE RADAR |
| : | : |

INFORMATION PROCESSING APPARATUS, AND INFORMATION PROCESSING METHOD, AND PROGRAM

CROSS-REFERENCE TO RELATED APPLICATIONS

The present application is based on PCT filing PCT/JP2020/018543, filed May 7, 2020, which claims priority to JP 2019-092644, filed May 16, 2019, the entire contents of each are incorporated herein by reference.

TECHNICAL FIELD

The present disclosure relates to an information processing apparatus, and an information processing method, and a program, and especially relates to an information processing apparatus, and an information processing method, and a program that allow travelable areas to be appropriately selected according to performances, functions, and types of sensors that a vehicle includes, to realize appropriate automatic driving while avoiding critical states.

BACKGROUND ART

It is expected that automatic driving of vehicles by means of sensors, such as cameras, radars, and the like, will become common, and will be put into practical use in a wide sphere, in the future.

However, in a case where automatic driving becomes common, and is put into practical use, there is a possibility that although in a typical passage environment, autonomous traveling is realized, in a nontypical passage environment, dangerous condition occurs according to a state, and condition where autonomous traveling cannot be performed occurs.

For example, suppose a case where a road without shoulders, such as a footpath through the fields, is passed by a vehicle that includes a radar apparatus supposed to have a relatively high detection accuracy even in bad weather, such as rain, dense fog, and the like, in addition to a camera, and light detection and ranging or laser imaging detection and ranging (LiDAR), by means of automatic driving, in a state, such as rain or dense fog.

In such a case, although the radar apparatus supposed to stand bad weather is provided, detection of road shoulders by means of the radar apparatus is originally difficult irrespective of weather. Further, detection accuracy of the camera and LiDAR also decreases due to the bad weather. Therefore, road shoulder detection itself is difficult, and danger in the automatic driving increases.

Furthermore, in a case where an oncoming car is met in a narrow road that is not one-way and is narrow to such an extent that vehicles can physically pass by but need to come close on the verge of grazing to pass by, the vehicles cannot pass by with sufficient safety secured, depending on the accuracy of sensors, and a state where either vehicle needs to move backward to yield is also conceivable.

In such a state, a sensor that has accuracy that is sufficient for the vehicle to move backward needs to be included in the back of the vehicle. When a sensor that includes such a condition is not included, the vehicle cannot move backward with sufficient safety secured. As a result, there is a possibility that automatic driving becomes impossible.

In this way, when the provision of driving assistance or automatic driving by means of a vehicle including various sensors, such as cameras, LiDAR, radar apparatuses, and the like, becomes common, there is a possibility that according to a performance, a function, and a type of each of the sensors, and a combination of the plurality of sensors, a case where it is expected that safety is sufficiently secured, and a case where securance of sufficient safety is not expected occur.

A nontypical traveling situation that may become such a state is a phenomenon that is small as appearance establishment of the phenomenon. However, if such a state is met, critical states, such as automatic traveling of the vehicle becoming impossible, and causing an accident are supposed. Therefore, such a state is desired to be avoided as long as it is possible.

Then, a technology is proposed that a radar is used instead of a camera in a place where it is impossible to see very far ahead, and danger information is informed of from a server, in a danger alert area around a vehicle, and thus critical states in a nontypical traveling situation can be preliminarily avoided (see Patent Document 1).

CITATION LIST

Patent Document

Patent Document 1: Japanese Patent Application Laid-Open No. 2017-062583

SUMMARY OF THE INVENTION

Problems to be Solved by the Invention

In the technology of Patent Document 1, however, although information for avoiding critical states is presented, information in which performances of sensors included in every vehicle are considered is not provided.

Therefore, although critical states can be avoided, even an area that is sufficiently passable, depending on vehicles, from estimation from performances and functions of included sensors, is notified of as an area that has a possibility of becoming critical states, and thus the area avoidance of which is not necessary is avoided. As a result, an unnecessary detour is made to be performed, and there is a possibility that appropriate automatic driving cannot be performed.

The present disclosure is performed, considering such a state, and especially allows travelable areas to be appropriately selected according to functions, performances, and types of sensors that autonomously moving vehicles individually include, and a combination of the functions, the performances, and the types, to realize appropriate automatic driving while avoiding critical states.

Solutions to Problems

An information processing apparatus of an aspect of the present disclosure is an information processing apparatus including: an acquisition unit that acquires traveling possibility or impossibility information set on the basis of sensor categories set on the basis of sensors with which vehicles are equipped, and a path of every area; and a determination unit that determines whether or not a route to a destination is most appropriate, on the basis of the sensor category of an own car, and the traveling possibility or impossibility information.

An information processing method and a program of an aspect of the present disclosure correspond to an information processing apparatus.

In an aspect of the present disclosure, traveling possibility or impossibility information set on the basis of sensor categories set on the basis of sensors with which vehicles are equipped, and a path of every area is acquired, and it is determined whether or not a route to a destination is most appropriate, on the basis of the sensor category of an own car, and the traveling possibility or impossibility information.

BRIEF DESCRIPTION OF DRAWINGS

FIG. 5 is a drawing that illustrates sensor categories.

MODE FOR CARRYING OUT THE INVENTION

Figure 1:
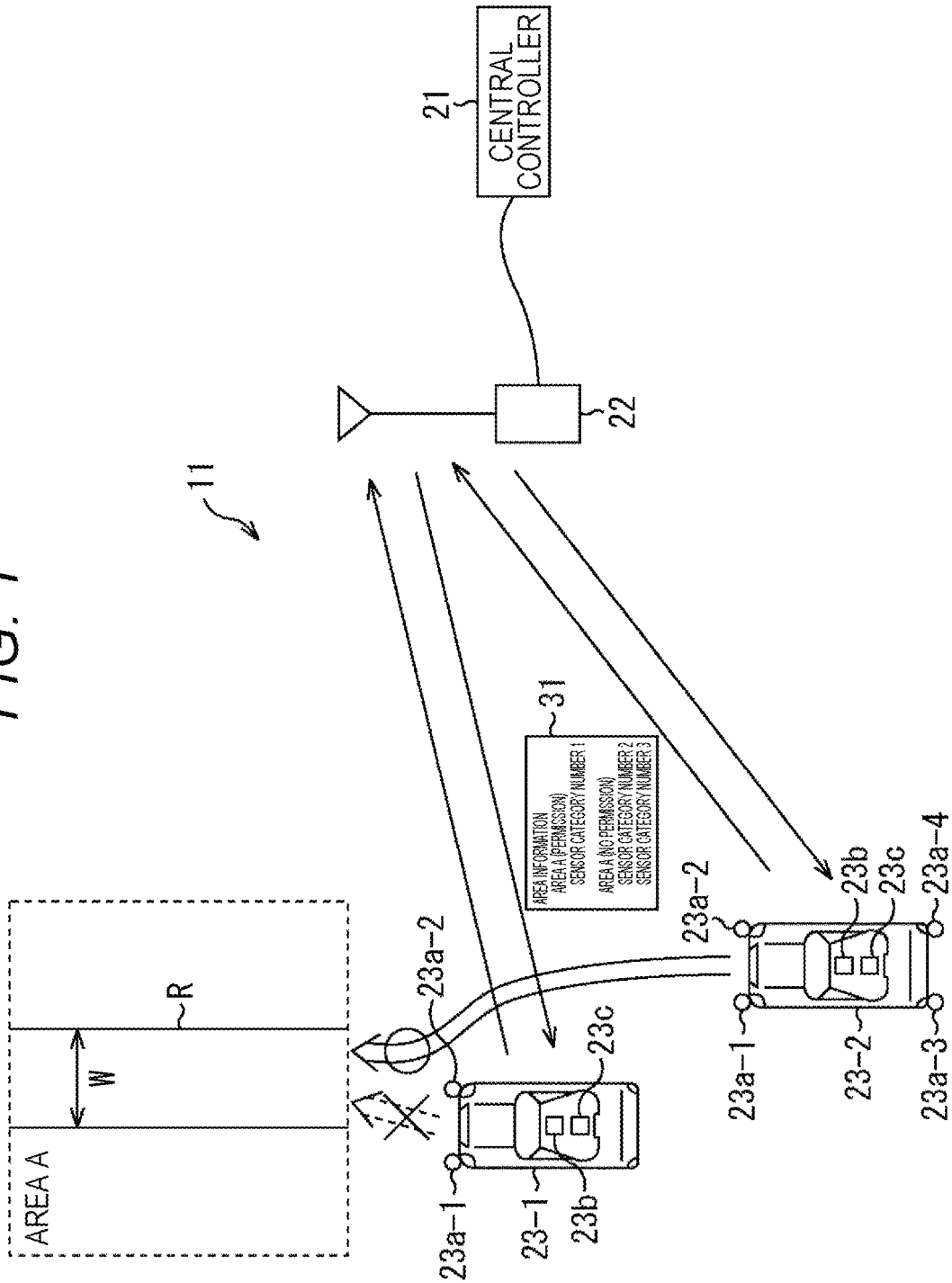
FIG. 1 is a drawing that illustrates a summary of the present disclosure.

Hereinafter, a preferred exemplary embodiment of the present disclosure will be described in detail with reference to the accompanying drawings. Note that in the present description and the drawings, constituents having substantially the same function and configuration are denoted by the same reference numeral, and redundant description is omitted.

Hereinafter, a mode for carrying out the present technology will be described. The description is performed in the following order.

1. Summary of the Present Disclosure
2. Preferred Exemplary Embodiment
3. Application Example 1 of Automatic-Driving Management Processing
4. Application Example 2 of Automatic-Driving Management Processing
5. Application Example 3 of Automatic-Driving Management Processing
6. Example Executed by Software 1. Summary of the Present Disclosure The present disclosure allows travelable areas to be appropriately selected according to performances, functions, and types of sensors that autonomously moving vehicles individually include, to realize appropriate automatic driving while avoiding critical states.

Here, a traffic control system 11 including a central controller 21, a wireless base station 22, and vehicles 23-1 and 23-2, as illustrated in FIG. 1, is exemplified to describe a summary of the present disclosure.

It is supposed that, in the traffic control system 11 in FIG. 1, for example, the vehicles 23-1 and 23-2 are each a vehicle that plans a travel route to a destination and autonomously performs automatic traveling, and are in the condition where the vehicles 23-1 and 23-2 are performing automatic traveling to predetermined destinations in FIG. 1. The travel route is selected according to preset conditions, input by a user input into an input unit 72, a state of a driver detected by a vehicle inside information detection unit 142, and the like.

Furthermore, the vehicle 23-1 includes sensors 23a-1 and 23a-2, such as radar apparatuses or the like, at left and right ends of the front of the vehicle body, a position information detection unit 23b that detects position information, and a communication unit 23c that communicates with the central controller 21 through the wireless base station 22.

Therefore, the vehicle 23-1 can grasp a position on a road by detecting position information by means of the position information detection unit 23b at a time of automatic driving if the road is a road with a road width wide to some extent, such as a highway. Therefore, the vehicle 23-1 can move forward and backward by recognizing position relationships with objects around a road if the road is a road with a road width wide to some extent.

Furthermore, the vehicle 23-1 needs to recognize position relationships with surrounding objects more accurately than the position information, at a time of automatic driving, in traveling a narrow road narrower than a predetermined road width. However, the vehicle 23-1 can appropriately recognize only position relationships with objects existing ahead by means of the sensors 23a-1 and 23a-2, and the like. Therefore, the vehicle 23-1 can move only forward in traveling a narrow road.

On the other hand, the vehicle 23-2 includes sensors 23a-1 to 23a-4, such as radar apparatuses or the like, at left and right ends of the front and back of the vehicle body, a position information detection unit 23b that detects position information, and a communication unit 23c that communicates with the central controller 21 through the wireless base station 22.

Therefore, the vehicle 23-2 can grasp a position on a road by detecting position information by means of the position information detection unit 23b at a time of automatic driving if the road is a road with a road width wide to some extent, such as a highway. Therefore, the vehicle 23-2 can move forward and backward by recognizing position relationships with objects around a road if the road is a road with a road width wide to some extent.

Moreover, the vehicle 23-2 can appropriately recognize position relationships with surrounding objects ahead and behind more accurately than the position information by means of the sensors 23a-1 to 23a-4, at a time of automatic driving, even in traveling a narrow road narrower than a predetermined road width. Therefore, the vehicle 23-2 can move forward and backward even in traveling a narrow road.

In this way, the vehicles 23-1 and 23-2 both can move forward and backward, at a time of automatic driving, in traveling a road with a road width relatively wide, such as a highway or the like. In traveling a narrow road, however, the vehicle 23-2 can move forward and backward, but the vehicle 23-1 can move only forward, depending on differences in installation positions and the number of the included sensors 23*a*.

Furthermore, the central controller 21 transmits, to the vehicles 23-1 and 23-2, and the like through the wireless base station 22, area information 31 including information that provides vehicles classified into a category that sensors necessary to travel roads in an area around the wireless base station 22 are included, with an attribute that permits passage through the area, and provides vehicles classified into a category that sensors necessary for the traveling are not included, with an attribute that does not permit passage through the area.

Note that categories set according to performances, functions, and types of sensors included by the above-described vehicles 23, and combinations of the performances, the functions, and the types are referred to as sensor categories.

The area information 31 is constituted by a list of sensor category numbers (sensor category number list) that specifies sensor categories that passage is permitted (passage is possible), and a list of sensor category numbers (sensor category number list) that specifies sensor categories that passage is not permitted (passage is impossible), for every area.

It is supposed that the central controller 21 classifies, for example, a sensor category of such vehicle 23-2 as including the sensors 23*a*-1 to 23*a*-4 in the front and back of the vehicle body into a sensor category number 1. Furthermore, it is supposed that the central controller 21 classifies a sensor category of the vehicles 23, such as such vehicle 23-1 as including the sensors 23*a*-1 and 23*a*-2 in only the front of the vehicle body, into a sensor category number 2. Then, it is supposed that the central controller 21 sets a sensor category of the vehicles 23 provided with no sensor 23*a*, to a sensor category number 3.

Therefore, the central controller 21 generates, for example, the area information 31 as information, such as "AREA A (PERMISSION) SENSOR CATEGORY NUMBER 1", and "AREA A (NO PERMISSION) SENSOR CATEGORY NUMBER 2, AND SENSOR CATEGORY NUMBER 3".

The "AREA A (PERMISSION) SENSOR CATEGORY NUMBER 1", and the "AREA A (NO PERMISSION) SENSOR CATEGORY NUMBER 2, AND SENSOR CATEGORY NUMBER 3" included in the area information 31 are sensor category information in an area associated with the area information 31.

Here, the sensor category information of the "AREA A (PERMISSION) SENSOR CATEGORY NUMBER 1" signifies that only passage of vehicles classified into a sensor category that indicates that sensors are provided for both the front and back of the vehicle body is permitted for roads in the area A (an attribute that indicates that passage is possible is assigned).

Furthermore, the sensor category information of the "AREA A (NO PERMISSION) SENSOR CATEGORY NUMBER 2, AND, SENSOR CATEGORY NUMBER 3" signifies that passage of vehicles classified into sensor categories that indicate vehicles provided with a sensor in only the front of the vehicle body, and vehicles with no sensor is not permitted for roads in the area A (an attribute that indicates that passage is impossible is assigned).

The area information 31 is constituted by sensor category information into which vehicles passage of which is permitted (that can pass through) are classified, and sensor category information into which vehicles passage of which is not permitted (that cannot pass through) are classified, for every area.

Here, a road R in the area A has a road width W that does not have a sufficient space relative to vehicle widths in the vehicles 23-1 and 23-2. Therefore, only determining a position on the road R by means of only position information and traveling has a danger of grazing objects that exist around the road R.

Furthermore, in such a case where an oncoming car or the like is met, the road R in the area A does not allow passing by. Therefore, either vehicle may need to move backward to yield. At this time, since it is necessary to recognize position relationships with objects behind the vehicle, it is necessary to provide a sensor 23*a* in the back of the vehicle body.

Therefore, the vehicles 23-1 and 23-2 each receive area information 31 supplied from the central controller 21 through the wireless base station 22, by means of the communication unit 23*c*, and in a case where the area A exists on a travel route that has been planned to travel from now on, the vehicles 23-1 and 23-2 determine, on the basis of the area information 31, whether or not traveling is possible.

That is, in a case of the vehicle 23-1, the vehicle 23-1 is a vehicle corresponding to the sensor category number 1 that the sensors 23*a*-1 and 23*a*-2 are provided at only left and right ends of the front. Therefore, in a case where the area A exists on the route, at such a time when an oncoming car is met on the road R, the vehicle 23-1 cannot move backward to yield to the oncoming car, as described above.

Therefore, in such a case, the vehicle 23-1 needs to avoid passage through the road R in the area A, as indicated by an X mark in FIG. 1.

Then, the vehicle 23-1 replans a route to avoid passage through the area A, on the basis of the area information 31, and travels the replanned route by means of automatic driving.

On the other hand, in a case of the vehicle 23-2, the sensors 23*a*-1 to 23*a*-4 are provided at left and right ends of the front and back. Therefore, even if the road R in the area A exists on the route, the vehicle 23-2 can pass through the road R, as indicated by an O mark in FIG. 1.

Then, the vehicle 23-2 continues traveling a present route including the area A, on the basis of the area information 31.

That is, the vehicles 23-1 and 23-2 each acquire area information distributed by the central controller 21, through the wireless base station 22.

Then, on the basis of sensor category information included in the acquired area information, the vehicles 23-1 and 23-3 determine whether the vehicle itself is a vehicle classified into a sensor category that traveling is possible or a vehicle classified into a sensor category that passage is impossible.

When, on the basis of the determination result using the area information, the vehicles 23-1 and 23-3 are classified into a sensor category that traveling is impossible (not permitted), a route is replanned to avoid passage through roads in an area corresponding to the area information, and traveling the replanned route is continued.

Furthermore, when traveling roads in an area corresponding to the area information is possible on the basis of the determination result using the area information, traveling a route planned at present is continued.

Due to such processing, the vehicles 23-1 and 23-2 can determine whether or not passage is possible (permitted) for every area, according to a sensor category into which the vehicle itself is classified, in a stage before traveling. When passage is not possible (permitted), the vehicles 23-1 and 23-2 can replan travel routes to avoid a corresponding area, and can continue traveling by means of automatic driving.

As a result, the vehicles 23-1 and 23-2 can continue traveling an appropriate route while avoiding critical states the occurrence of which is foreseen in traveling in automatic driving.

2. Preferred Exemplary Embodiment

Next, a traffic control system to which the present disclosure is applied will be described with reference to FIG. 2.

Figure 2:
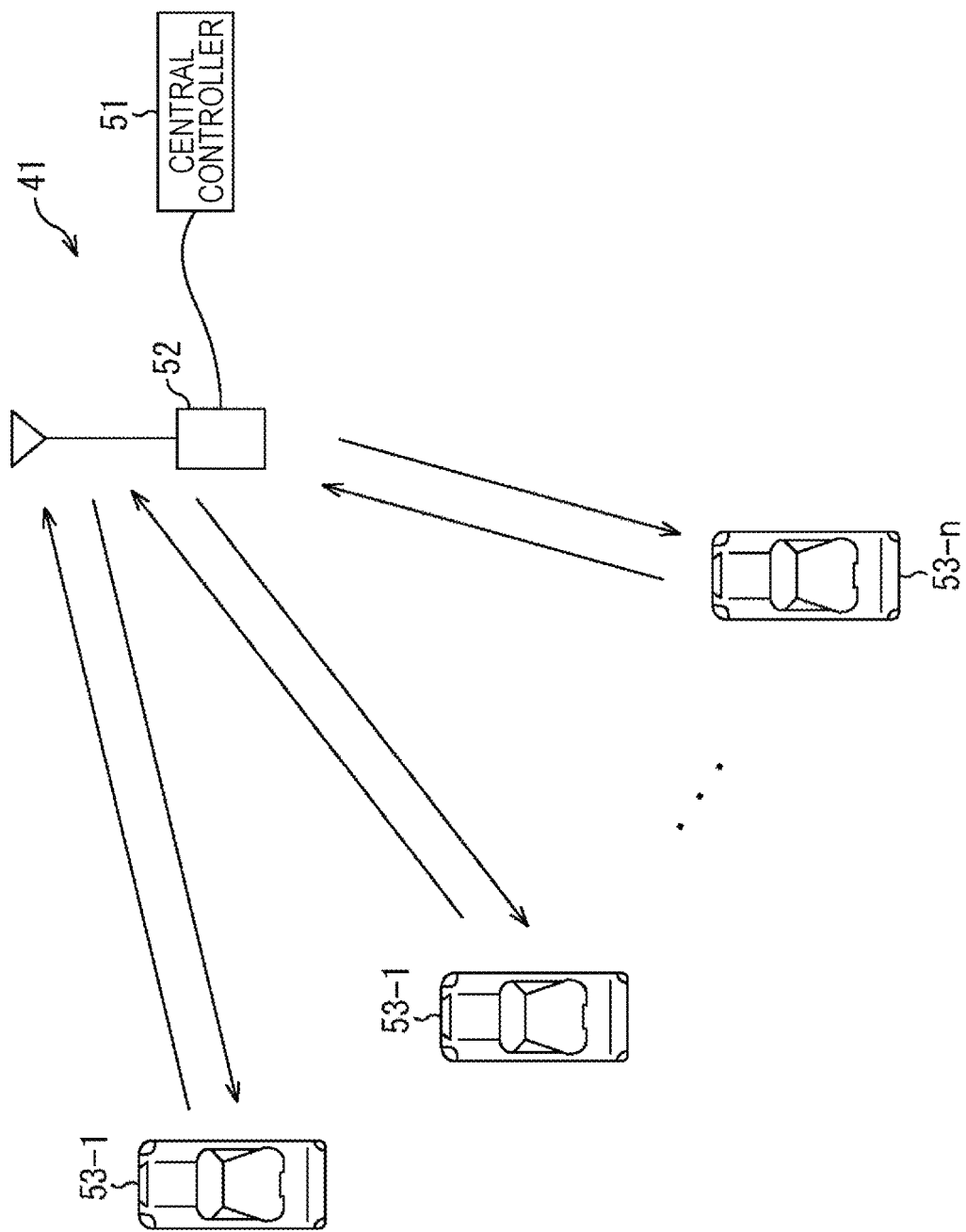
FIG. 2 is a drawing that illustrates a configuration example of a traffic control system of the present disclosure.

A traffic control system 41 in FIG. 2 is constituted by a central controller 51, a wireless base station 52, and vehicles 53-1 to 53-*n*.

Note that the central controller 51, the wireless base station 52, and the vehicles 53-1 to 53-*n* correspond to the central controller 21, the wireless base station 22, and the vehicles 23-1 and 23-2 in the traffic control system 11 in FIG. 1, respectively.

The central controller 51 controls the whole traffic control system 41, is constituted by, for example, a server computer, a cloud computer, or the like, and makes area information and indicator information be transmitted to each of the vehicles 53-1 to 53-*n* through the wireless base station 52.

The area information corresponds to the area information 31 described with reference to FIG. 1, is information of every area set on a map, and is information indicating an attribute of permission or no permission for passage when roads in the areas are passed through, according to a sensor category set on the basis of performances, functions, and types of sensors that are necessary for automatic traveling and are included by each of the vehicles 53-1 to 53-*n*, and combinations of the performances, the functions, and the types.

Furthermore, the indicator information is information that includes position information about the wireless base station 52 that transmits the area information, and information about a transmission time and a transmission frequency of the area information.

That is, the central controller 51 transmits the indicator information to the vehicles 53 through the wireless base station 52, at predetermined timings and at a predetermined transmission frequency. The predetermined timings and the predetermined frequency are information of which the vehicles 53 are preliminarily and widely informed as common information.

The vehicles 53 receive the indicator information transmitted from the central controller 51 through the wireless base station 52, at the predetermined timings and at the predetermined transmission frequency.

Then, on the basis of the received indicator information, the vehicles 53 recognize the transmission time and the transmission frequency at which area information is transmitted from the wireless base station 52, and receives the area information transmitted through the wireless base station 52 at the transmission time and the transmission frequency pinpointed by the indicator information.

The wireless base station 52 uses a wide-area public line by means of fourth generation (4G) communication, such as long term evolution (LTE) or the like, to transmit indicator information and area information supplied from the central controller 51 connected with the wireless base station 52 through a dedicated line or the like, to the vehicles 53-1 to 53-*n*.

Note that the public line used by the wireless base station 52 may be any line as long as the public line is a communication line generally used for mobile phones or the like.

The vehicles 53 receive indicator information transmitted from the central controller 51 through the wireless base station 52, and receive area information, on the basis of the indicator information.

Furthermore, on the basis of the area information, the vehicle 53 recognizes a sensor category of the own car, on the basis of performances, functions, and types of sensors that the vehicle 53 itself includes, and a combination of the performances, the functions, and the types, and determines, according to the recognized sensor category of the own car, whether or not passage is possible for every area on a route that corresponds to the area information.

At this time, in a case where on the basis of the area information, it is determined that there is an impassable area on a planned route, the vehicle 53 replans a route to avoid the area that has been determined as impassable, and continues automatic traveling through the replanned route. Furthermore, since area information is updated in real time, an area that has been impassable at an immediately previous timing, for example, the vehicle 53 replans a route that includes an area that has been impassable at an immediately previous timing but becomes passable, and continues automatic driving through the replanned route.

Furthermore, when a route is replanned, the route may not be the shortest route. For example, a route that makes fuel efficiency the best, a route that can be traveled the most safely on the basis of a sensor category, or the like may be replanned. However, in the present description, also hereinafter, the description where it is supposed that the shortest route is planned at a time of replanning a route will be proceeded. Here, the shortest route is a route that takes the shortest time to a destination, a route with the shortest travel distance, a route with the shortest straight distance, or the like. Note that a plurality of routes may be replanned. In that case, selection of the replanned routes may be performed according to preset conditions, input by a user input into the input unit 72, a state of a driver detected by the vehicle inside information detection unit 142, or the like.

<Configuration Example of Central Controller>

Figure 3:
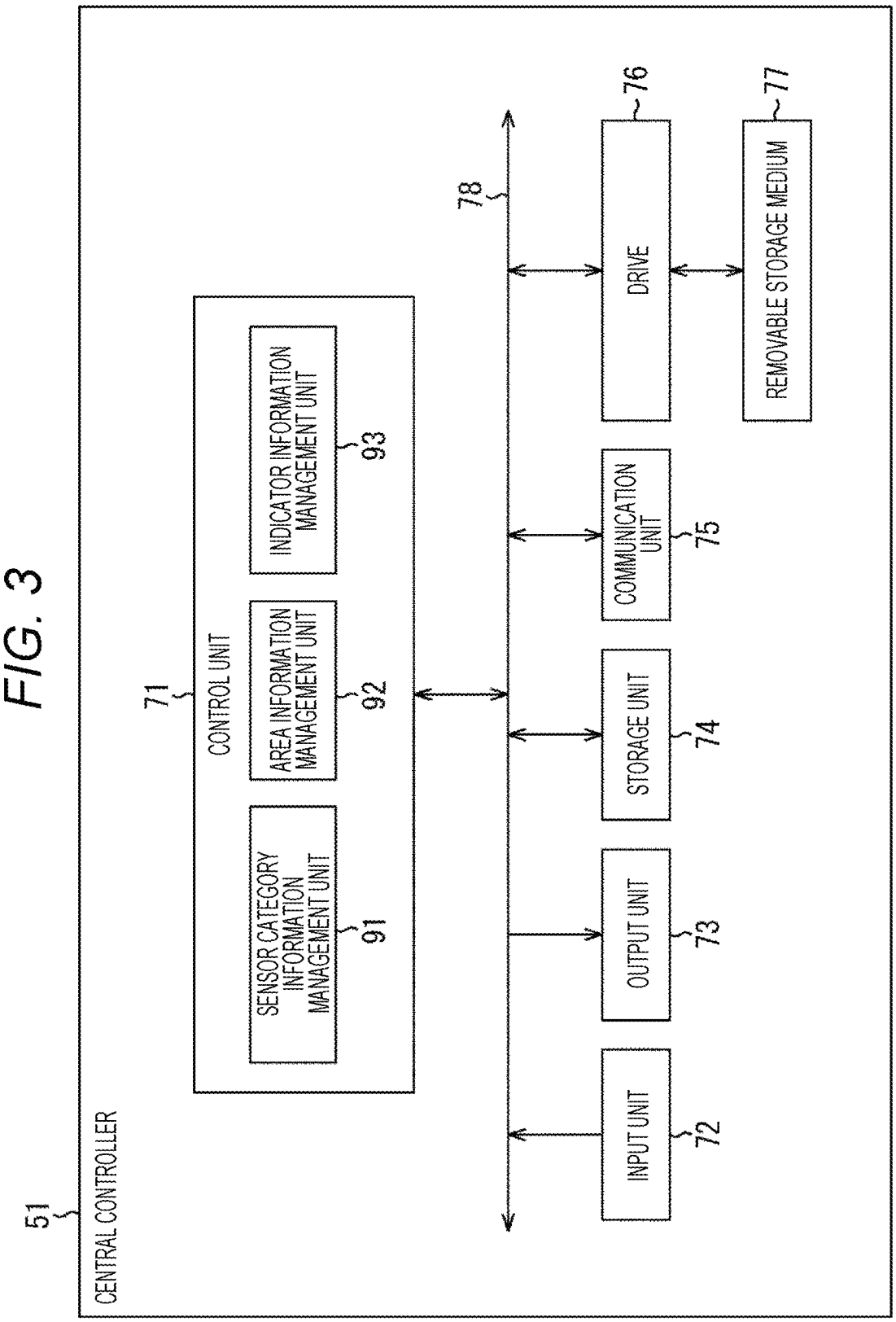
FIG. 3 is a block diagram that illustrates a configuration example of a central controller in FIG. 2.

Next, a configuration example of the central controller 51 will be described with reference to a block diagram of FIG. 3.

The central controller 51 is constituted by a control unit 71, the input unit 72, an output unit 73, a storage unit 74, a communication unit 75, a drive 76, and a removable storage medium 77 that are electrically connected with each other through a bus 78.

The control unit 71 is constituted by a processor and a memory, and controls whole operations of the central controller 51.

Furthermore, the control unit 71 includes a sensor category information management unit 91, an area information management unit 92, and an indicator information management unit 93.

The sensor category information management unit 91 sets sensor categories, according to performances, functions, and types of sensors included in the vehicles 53, and combinations of the performances, the functions, and the types, and manages each of the sensor categories as sensor category information including a sensor category number and a corresponding sensor group. Furthermore, the sensor category information may be preliminarily provided at a time of vehicle registration or the like, and may be updated through a wired or wireless network, as necessary, at a time of modification of a vehicle sensor, or the like.

Note that details of the sensor category information will be described later with reference to FIG. 5.

The area information management unit 92 generates area information of every area set on a map, and manages the area information.

More specifically, the area information management unit 92 sets a sensor category that provides an attribute that indicates that traveling is possible, and a sensor category that provides an attribute that indicates that traveling is impossible, for every area, on the basis of road information, such as road widths of existing roads, buildings and obstacles along the roads, and the like, weather information, and traffic information that includes the presence and absence of traffic accidents, traffic congestion, road construction, and the like, of every area, and various environment information, such as brightness, a temperature, and the like in a subject area at a current time, and the sensor category information.

Then, the area information management unit 92 generates area information from information of the sensor categories that provide an attribute that indicates that traveling is possible, and sensor categories that provide an attribute that indicates that traveling is impossible, for every area, and distributes the area information to the vehicles 53 through the wireless base station 52.

Note that details of sensor information will be described later with reference to FIG. 6.

The indicator information management unit 93 generates various information relating to distribution of area information, such as a position of the wireless base station 52 that distributes the area information, a transmission time, a transmission frequency, and the like, as indicator information, and distributes the indicator information to the vehicles 53 through the wireless base station 52.

Note that details of the indicator information will be described later together with the sensor information with reference to FIG. 6.

The input unit 72 is constituted by a keyboard, operation buttons, and the like, and receives operation input from a user.

The output unit 73 includes a display unit that displays images and is a display including, for example, a liquid crystal display (LCD), an organic electro luminescence (EL), or the like, or the like, and a sound output unit that outputs sounds and includes a speaker or the like, and outputs images and sounds as necessary.

The storage unit 74 is controlled by the control unit 71, includes a hard disk drive (HDD), a solid state drive (SSD), a semiconductor memory, or the like. Various data and programs are written to or retrieved from the storage unit 74.

Furthermore, the storage unit 74 stores sensor category information, area information, and indicator information, as necessary, generated or managed by the sensor category information management unit 91, the area information management unit 92, and the indicator information management unit 93, respectively.

The communication unit 75 is controlled by the control unit 71, and performs the wireless base station 52 through a communication network represented by a local area network (LAN) or the like, by wire (or wirelessly (not illustrated)).

The drive 76 writes and reads data to and from the removable storage medium 77, such as a magnetic disk (including a flexible disk), an optical disc (including a compact disc-read only memory (CD-ROM) and a digital versatile disc (DVD)), a magneto-optical disc (including a Mini Disc (MD)), a semiconductor memory, or the like.

<Configuration Example of Vehicle Control System that Controls Vehicles>

Figure 4:
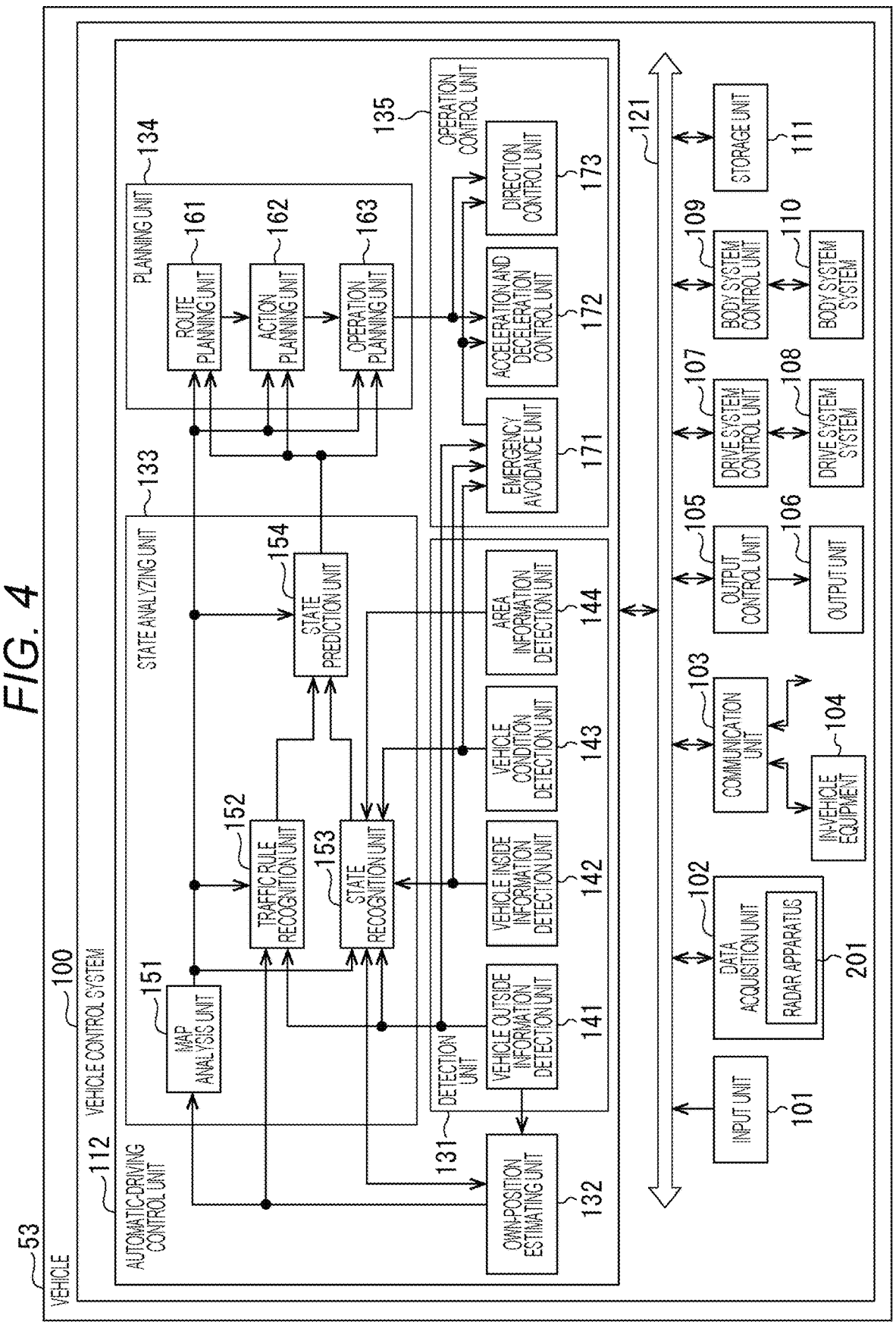
FIG. 4 is a block diagram that illustrates a configuration example of a vehicle in FIG. 2.

FIG. 4 is a block diagram that illustrates a configuration example of schematic functions of a vehicle control system 100 that is an example of a mobile-body control system to which the present technology may be applied, and controls the vehicle 53.

Note that hereinafter, in a case where the vehicle 53 provided with the vehicle control system 100 is distinguished from other vehicles, the vehicle 53 is referred to as the own car or the own vehicle.

The vehicle control system 100 includes an input unit 101, a data acquisition unit 102, a communication unit 103, in-vehicle equipment 104, an output control unit 105, an output unit 106, a drive system control unit 107, a drive system 108, a body system control unit 109, a body system 110, a storage unit 111, and an automatic-driving control unit 112. The input unit 101, the data acquisition unit 102, the communication unit 103, the output control unit 105, the drive system control unit 107, the body system control unit 109, the storage unit 111, and the automatic-driving control unit 112 are connected with each other through a communication network 121. The communication network 121 includes, for example, an on-vehicle communication network, a bus, and the like that comply with an optional standard, such as a controller area network (CAN), a local interconnect network (LIN), a local area network (LAN), or FlexRay (registered trademark). Note that each of the units of the vehicle control system 100 may be directly connected not through the communication network 121.

Note that hereinafter, in a case where each of the units of the vehicle control system 100 performs communication through the communication network 121, a description of the communication network 121 will be omitted. For example, in a case where the input unit 101 and the automatic-driving control unit 112 perform communication through the communication network 121, the description is only that the input unit 101 and the automatic-driving control unit 112 perform communication.

The input unit 101 includes apparatuses used by a passenger to input various data, instructions, and the like. For example, the input unit 101 includes operation devices, such as a touch panel, buttons, a microphone, switches, levers, and the like, operation devices into which input can be performed using methods except manual operation, by means of a sound, a gesture, and the like, and the like. Furthermore, for example, the input unit 101 may be a remote control apparatus that uses infrared rays or other radio waves, or external connection equipment that corresponds to operation of the vehicle control system 100, such as mobile equipment, wearable equipment, or the like. The input unit 101 generates an input signal on the basis of data, an instruction, and the like input by a passenger, and supplies the input signal to each of the units of the vehicle control system 100.

The data acquisition unit 102 includes various sensors and the like that acquire data used for processing by the vehicle control system 100, and supplies the acquired data to each of the units of the vehicle control system 100.

For example, the data acquisition unit 102 includes various sensors for detecting the condition of the own car, and the like. Specifically, for example, the data acquisition unit 102 includes a gyroscope, an acceleration sensor, an inertial measurement unit (IMU), and sensors and the like for detecting an operation amount of an accelerator pedal, an operation amount of a brake pedal, a steering angle of a steering wheel, an engine rotation speed, a motor rotation speed, a rotation speed of a wheel, or the like.

Furthermore, for example, the data acquisition unit 102 includes various sensors for detecting information about the outside of the own car. Specifically, for example, the data acquisition unit 102 includes imaging apparatuses, such as a time of flight (ToF) camera, a stereo camera, a single-lens camera, an infrared camera, another camera, and the like. Furthermore, for example, the data acquisition unit 102 includes environment sensors for detecting climate, weather, or the like, and surroundings information detection sensors for detecting objects in surroundings around the own car. The environment sensors include, for example, a rain drop sensor, a fog sensor, a sunshine sensor, a snow sensor, and the like. The surroundings information detection sensors include, for example, an ultrasonic sensor, a radar, light detection and ranging or laser imaging detection and ranging (LiDAR), a sonar, and the like.

Moreover, for example, the data acquisition unit 102 includes various sensors for detecting a current position of the own car. Specifically, for example, the data acquisition unit 102 includes a global navigation satellite system (GNSS) receiver that receives GNSS signals from GNSS satellites, and the like.

Furthermore, for example, the data acquisition unit 102 includes various sensors for detecting information about the inside of the own car. Specifically, for example, the data acquisition unit 102 includes an imaging apparatus that images a driver, a bio-sensor that detects bio-information about a driver, a microphone that collects sounds in a vehicle chamber, and the like. The bio-sensor is provided, for example, at a seat surface, a steering wheel, or the like, and detects bio-information about a passenger sitting on the seat or a driver holding the steering wheel.

The communication unit 103 communicates with the in-vehicle equipment 104, and various equipment outside the vehicle, servers, base stations, and the like, and transmits data supplied from each of the units of the vehicle control system 100, and supplies received data to each of the units of the vehicle control system 100. Note that a communication protocol supported by the communication unit 103 is not particularly limited. Furthermore, the communication unit 103 can also support a plurality of types of communication protocols.

For example, the communication unit 103 performs wireless communication with the in-vehicle equipment 104 by means of a wireless LAN, Bluetooth (registered trademark), Near Field Communication (NFC), Wireless Universal Serial Bus (WUSB), or the like. Furthermore, for example, the communication unit 103 performs wired communication with the in-vehicle equipment 104 through connection terminals not illustrated (and a cable if necessary), by means of Universal Serial Bus (USB), High-Definition Multimedia Interface (HDMI) (registered trademark), Mobile High-definition Link (MHL), or the like.

Moreover, for example, the communication unit 103 performs communication with equipment (for example, an application server or a control server) existing on an external network (for example, the Internet, a cloud network, or a network unique to a business entity), through a base station or an access point. Furthermore, for example, the communication unit 103 uses a peer to peer (P2P) technology to perform communication with a terminal existing near the own car (for example, a terminal of a pedestrian or a shop, or a machine type communication (MTC) terminal). Moreover, for example, the communication unit 103 performs vehicle to everything (V2X) communication, such as vehicle to vehicle communication, vehicle to infrastructure communication, vehicle to home communication, vehicle to pedestrian communication, and the like. Furthermore, for example, the communication unit 103 includes a beacon receiver, receives radio waves or electromagnetic waves transmitted from a wireless station or the like installed on a road, and acquires information, such as a current position, congestion, passage regulation, a required time, or the like.

The in-vehicle equipment 104 includes, for example, mobile equipment or wearable equipment that a passenger has, information equipment brought into or attached to the own car, a navigation apparatus that performs a search for a path to an optional destination, and the like.

The output control unit 105 controls output of various information to a passenger in the own car or the outside of the car. For example, the output control unit 105 controls output of sight information and hearing information from the output unit 106 by generating an output signal including at least one of sight information (for example, image data) or hearing information (for example, sound data) and supplying the output signal to the output unit 106. Specifically, for example, the output control unit 105 combines image data imaged by different imaging apparatuses of the data acquisition unit 102 to generate a bird's eye image, a panoramic image, or the like, and supplies an output signal including the generated image to the output unit 106. Furthermore, for example, the output control unit 105 generates sound data including a warning sound, a warning message, or the like against a danger, such as a collision, grazing, an entry into a danger zone, or the like, and supplies an output signal including the generated sound data, to the output unit 106.

The output unit 106 includes apparatuses that can output sight information or hearing information to a passenger in the own car or the outside of the car. For example, the output unit 106 includes a display apparatus, an instrument panel, an audio loudspeaker, headphones, wearable devices worn by a passenger, such as an eyeglasses-type display and the like, a projector, lamps, and the like. A display apparatus that the output unit 106 includes may be an apparatus that displays sight information in a field of vision of a driver, such as a head-up display, a transparent display, an apparatus that has an augmented reality (AR) display function, or the like, except an apparatus including a common display.

The drive system control unit 107 performs the control over the drive system 108 by generating and supplying various control signals to the drive system system 108. Furthermore, the drive system control unit 107 supplies control signals to each of the units except the drive system 108 to perform a notification of the control condition of the drive system 108, and the like, as necessary.

The drive system 108 includes various apparatuses relating to a drive system of the own car. For example, the drive system 108 includes a drive power generation apparatus for generating drive power, such as an internal-combustion engine, a drive motor, or the like, a drive power transmission mechanism for transmitting drive power to wheels, a steering mechanism that adjusts a steering angle, a braking apparatus that generates a braking force, an antilock brake system (ABS), electronic stability control (ESC), an electric power steering apparatus, and the like.

The body system control unit 109 performs the control over the body system 110 by generating and supplying various control signals to the body system system 110. Furthermore, the body system control unit 109 supplies control signals to each of the units except the body system 110 to perform a notification of the control condition of the body system 110, and the like, as necessary.

The body system 110 includes various apparatuses of a body system with which the vehicle body is equipped. For example, the body system 110 includes a keyless entry system, a smart key system, a power window apparatus, a power seat, a steering wheel, an air conditioner, various lamps (for example, head lamps, back lamps, brake lamps, turn signals, fog lamps, and the like), and the like.

The storage unit 111 includes, for example, a read only memory (ROM), a random access memory (RAM), a magnetic storage device, such as a hard disc drive (HDD) or the like, a semiconductor storage device, an optical storage device, a magneto-optical storage device, and the like. The storage unit 111 stores various programs, data, and the like used by each of the units of the vehicle control system 100. For example, the storage unit 111 stores map data, such as an accurate map that is three-dimensional, such as a dynamic map or the like, a global map that is less accurate and covers a wider area than the accurate map, a local map that includes information about surroundings around the own car, and the like.

The automatic-driving control unit 112 performs the control relating to automatic driving, such as autonomous traveling, driving assistance, or the like. Specifically, for example, the automatic-driving control unit 112 performs cooperative control for the purpose of realizing functions of an advanced driver assistance system (ADAS) that includes collision avoidance or impact mitigation of the own car, adaptive traveling based on a distance between vehicles, vehicle speed maintenance traveling, collision warning of the own car, lane deviation warning of the own car, or the like. Furthermore, for example, the automatic-driving control unit 112 performs cooperative control for the purpose of automatic driving that autonomously travels without depending on operation of a driver, and the like. The automatic-driving control unit 112 includes a detection unit 131, an own-position estimating unit 132, a state analyzing unit 133, a planning unit 134, and an operation control unit 135.

The detection unit 131 performs detection of various information necessary for the control over automatic driving. The detection unit 131 includes a vehicle outside information detection unit 141, the vehicle inside information detection unit 142, a vehicle condition detection unit 143, and an area information detection unit 144.

The vehicle outside information detection unit 141 performs processing of detecting information about the outside of the own car, on the basis of data or signals from each of the units of the vehicle control system 100. For example, the vehicle outside information detection unit 141 performs processing of detecting, processing of recognizing, and processing of tracking objects around the own car, and processing of detecting distances to the objects. The objects as detection subjects include, for example, vehicles, humans, obstacles, structures, roads, traffic lights, traffic signs, road marks, and the like. Furthermore, for example, the vehicle outside information detection unit 141 performs processing of detecting an environment of surroundings around the own car. The environment of surroundings as detection subjects includes, for example, weather, temperature, humidity, brightness, the condition of a road surface, and the like. The vehicle outside information detection unit 141 supplies data indicating results of the detecting processing to the own-position estimating unit 132, a map analysis unit 151, a traffic rule recognition unit 152, and a state recognition unit 153 of the state analyzing unit 133, and an emergency avoidance unit 171 of the operation control unit 135, and the like.

The vehicle inside information detection unit 142 performs processing of detecting information about the inside of the vehicle, on the basis of data or signals from each of the units of the vehicle control system 100. For example, the vehicle inside information detection unit 142 performs processing of authenticating and processing of recognizing a driver, processing of detecting the condition of a driver, processing of detecting a passenger, processing of detecting an environment in the vehicle, and the like. The condition of a driver as detection subjects includes, for example, physical condition, an awakening degree, a concentration degree, a fatigue degree, a line-of-sight direction, and the like. The environment in the vehicle as detection subjects includes, for example, temperature, humidity, brightness, smell, and the like. The vehicle inside information detection unit 142 supplies data indicating results of the detecting processing to the state recognition unit 153 of the state analyzing unit 133, the emergency avoidance unit 171 of the operation control unit 135, and the like.

The vehicle condition detection unit 143 performs processing of detecting the condition of the own car, on the basis of data or signals from each of the units of the vehicle control system 100. The condition of the own car as detection subjects includes, for example, a speed, an acceleration, a steering angle, the presence or absence and details of a malfunction, the condition of driving operation, a position and an inclination of a power seat, the condition of a door lock, the condition of other on-vehicle equipment, and the like. The vehicle condition detection unit 143 supplies data indicating results of the detecting processing to the state recognition unit 153 of the state analyzing unit 133, the emergency avoidance unit 171 of the operation control unit 135, and the like.

The area information detection unit 144 controls the communication unit 103 to receive indicator information and area information transmitted from the central controller 51 through the wireless base station 52.

The area information detection unit 144 receives area information on the basis of the indicator information, and outputs the area information to the state recognition unit 153.

The own-position estimating unit 132 performs processing of estimating a position, an orientation, and the like of the own car on the basis of data or signals from each of the units of the vehicle control system 100, such as the vehicle outside information detection unit 141, the state recognition unit 153 of the state analyzing unit 133, and the like. Furthermore, the own-position estimating unit 132 generates a local map used for an estimate of an own position (hereinafter referred to as the map for an own-position estimate), as necessary. The map for an own-position estimate is, for example, an accurate map using a technology, such as Simultaneous Localization and Mapping (SLAM) or the like. The own-position estimating unit 132 supplies data indicating results of the estimating processing to the map analysis unit 151, the traffic rule recognition unit 152, and the state recognition unit 153 of the state analyzing unit 133, and the like. Furthermore, the own-position estimating unit 132 makes the storage unit 111 store the map for an own-position estimate.

The state analyzing unit 133 performs processing of analyzing a state of the own car and the surroundings. The state analyzing unit 133 includes the map analysis unit 151, the traffic rule recognition unit 152, the state recognition unit 153, and a state prediction unit 154.

The map analysis unit 151 performs processing of an analysis of various maps stored in the storage unit 111 while using data or signals from each of the units of the vehicle control system 100, such as the own-position estimating unit 132, the vehicle outside information detection unit 141, and the like, as necessary, and builds a map including information necessary for processing of automatic driving. The map analysis unit 151 supplies the build map to the traffic rule recognition unit 152, the state recognition unit 153, the state prediction unit 154, and a route planning unit 161, an action planning unit 162, and an operation planning unit 163 of the planning unit 134, and the like.

The traffic rule recognition unit 152 performs processing of recognizing traffic rules of surroundings around the own car on the basis of data or signals from each of the units of the vehicle control system 100, such as the own-position estimating unit 132, the vehicle outside information detection unit 141, the map analysis unit 151, and the like. Due to the recognizing processing, for example, positions and the condition of signals in surroundings around the own car, details of traffic regulation in surroundings around the own car, travelable lanes, and the like are recognized. The traffic rule recognition unit 152 supplies data indicating results of the recognizing processing to the state prediction unit 154 and the like.

The state recognition unit 153 performs processing of recognizing a state relating to the own car on the basis of data or signals from each of the units of the vehicle control system 100, such as the own-position estimating unit 132, the vehicle outside information detection unit 141, the vehicle inside information detection unit 142, the vehicle condition detection unit 143, the map analysis unit 151, and the like. For example, the state recognition unit 153 performs processing of recognizing a state of the own car, a state of surroundings around the own car, a state of a driver of the own car, and the like. Furthermore, the state recognition unit 153 generates a local map used for recognition of a state of surroundings around the own car (hereinafter referred to as the map for state recognition), as necessary. The map for state recognition is, for example, an occupancy grid map.

The state of the own car as recognition subjects includes, for example, a position, an orientation, movements (for example, a speed, an acceleration, a movement direction, and the like), the presence or absence and details of a malfunction, and the like of the own car. The state of surroundings around the own car as recognition subjects includes, for example, types and positions of stationary objects in the surroundings, types, positions, and movements (for example, a speed, an acceleration, a movement direction, and the like) of moving objects in the surroundings, a configuration of roads in the surroundings and the condition of the road surfaces, the weather, a temperature, humidity, and brightness in the surroundings, and the like. The condition of a driver as recognition subjects includes, for example, physical condition, an awakening degree, a concentration degree, a fatigue degree, a movement of a line-of-sight, driving operation, and the like.

The state recognition unit 153 supplies data indicating results of the recognizing processing (including the map for state recognition, as necessary) to the own-position estimating unit 132, the state prediction unit 154, and the like. Furthermore, the state recognition unit 153 makes the storage unit 111 store the map for state recognition.

The state recognition unit 153 outputs area information supplied from the area information detection unit 144 and corresponding to a sensor category of the own vehicle 53, to the state prediction unit 154.

The state prediction unit 154 performs processing of predicting states relating to the own car on the basis of data or signals from each of the units of the vehicle control system 100, such as the map analysis unit 151, the traffic rule recognition unit 152, the state recognition unit 153, and the like. For example, the state prediction unit 154 performs processing of predicting a state of the own car, a state of surroundings around the own car, a state of a driver, and the like.

The state of the own car as prediction subjects includes, for example, a behavior of the own car, the occurrence of a malfunction, a travelable distance, and the like. The state of surroundings around the own car as prediction subjects includes, for example, behaviors of moving objects in surroundings around the own car, changes in the condition of signals, changes in an environment, such as weather and the like, and the like. The state of a driver as prediction subjects includes, for example, a behavior, the physical condition, and the like of a driver.

The state prediction unit 154 supplies data indicating results of the predicting processing, together with data from the traffic rule recognition unit 152 and the state recognition unit 153, to the route planning unit 161, the action planning unit 162, and the operation planning unit 163 of the planning unit 134, and the like.

The results of the predicting processing include area information supplied from the area information detection unit 144 through the state recognition unit 153.

The route planning unit 161 plans a route to a destination on the basis of data or signals from each of the units of the vehicle control system 100, such as the map analysis unit 151, the state prediction unit 154, and the like. For example, the route planning unit 161 sets a route from a current position to a pinpointed destination, on the basis of a global map. Furthermore, for example, the route planning unit 161 appropriately changes a route, on the basis of states, such as congestion, accidents, passage regulation, construction, and the like, and the physical condition of a driver, and the like. The route planning unit 161 supplies data indicating the planned route to the action planning unit 162 and the like.

The route planning unit 161 acquires area information supplied from the area information detection unit 144 through the state recognition unit 153 and the state prediction unit 154. On the basis of the area information, in a case where an impassable area exists on an already planned route, the route planning unit 161 avoids the impassable area, and replans a route by means of a passable area.

Furthermore, since area information is generated in real time, an area that has been impassable for a sensor category of the own car due to, for example, stormy weather, in predetermined area information, at an immediately previous timing may become passable in area information at a next timing since the weather improves.

Accordingly, when area information changes and passage becomes possible in this way, the route planning unit 161 replans a route in the condition in which the route includes an area that becomes passable, and has been avoided when a route has been planned at an immediately previous timing.

The action planning unit 162 plans actions of the own car for safely traveling a route planned by the route planning unit 161 within a planned time, on the basis of data or signals from each of the units of the vehicle control system 100, such as the map analysis unit 151, the state prediction unit 154, and the like. For example, the action planning unit 162 performs planning of a start, a stop, a movement direction (for example, a forward movement, a backward movement, a left turn, a right turn, a direction change, or the like), a travel lane, a travel speed, passing, and the like. The action planning unit 162 supplies data indicating planned actions of the own car to the operation planning unit 163 and the like.

The operation planning unit 163 plans operations of the own car for realizing actions planned by the action planning unit 162, on the basis of data or signals from each of the units of the vehicle control system 100, such as the map analysis unit 151, the state prediction unit 154, and the like. For example, the operation planning unit 163 performs planning of acceleration, deceleration, a travel orbit, and the like. The operation planning unit 163 supplies data indicating the planned operations of the own car to an acceleration and deceleration control unit 172 and a direction control unit 173 of the operation control unit 135, and the like.

The operation control unit 135 performs the control over operations of the own car. The operation control unit 135 includes the emergency avoidance unit 171, the acceleration and deceleration control unit 172, and the direction control unit 173.

The emergency avoidance unit 171 performs processing of detecting emergencies, such as a collision, grazing, an entry into a danger zone, an abnormality of a driver, a malfunction of the vehicle, and the like, on the basis of detection results of the vehicle outside information detection unit 141, the vehicle inside information detection unit 142, and the vehicle condition detection unit 143. In a case where the emergency avoidance unit 171 detects the occurrence of an emergency, the emergency avoidance unit 171 plans an operation of the own car for avoiding the emergency, such as a sudden stop, a sudden turn, or the like. The emergency avoidance unit 171 supplies data indicating the planned operation of the own car to the acceleration and deceleration control unit 172, the direction control unit 173, and the like.

The acceleration and deceleration control unit 172 performs acceleration and deceleration control for realizing an operation of the own car planned by the operation planning unit 163 or the emergency avoidance unit 171. For example, the acceleration and deceleration control unit 172 calculates a control target value for the drive power generation apparatus or the braking apparatus for realizing planned acceleration, deceleration, or a sudden stop, and supplies a control command indicating the calculated control target value to the drive system control unit 107.

The direction control unit 173 performs direction control for realizing an operation of the own car planned by the operation planning unit 163 or the emergency avoidance unit 171. For example, the direction control unit 173 calculates a control target value for the steering mechanism for realizing a travel orbit or a sudden turn planned by the operation planning unit 163 or the emergency avoidance unit 171, and supplies a control command indicating the calculated control target value to the drive system control unit 107.

<Sensor Category>

A sensor category is set on the basis of performances, functions, and types of cameras and sensors provided for the data acquisition unit 102 of the vehicle 53, and a combination of the performances, the functions, and the types. The sensor category is information that classifies the vehicle 53 according to performances, functions, and types of sensors of the vehicle 53, and a combination of the performances, the functions, and the types.

More specifically, the sensor category information is information set from a sensor category number and corresponding sensors (group), as illustrated, for example, in FIG. 5.

In FIG. 5, sensor category numbers are written on the left, and information about corresponding sensor groups are written on the right.

For example, in the top row in FIG. 5, it is indicated that a sensor group corresponding to a sensor category of a sensor category number 1 is 360-degree LiDAR, an omnidirectional radar, and forward and backward cameras. That is, it is indicated that the vehicle 53 that includes the sensor group including 360-degree LiDAR, an omnidirectional radar, and forward and backward cameras is classified into a sensor category indicated by the sensor category number 1.

Furthermore, for example, in the second top row in FIG. 5, it is indicated that a sensor group corresponding to a sensor category of a sensor category number 2 is an omnidirectional radar, and forward and backward cameras.

That is, it is indicated that the vehicle 53 that includes the sensor group including an omnidirectional radar, and forward and backward cameras is classified into a sensor category indicated by the sensor category number 2.

Moreover, for example, in the third top row in FIG. 5, it is indicated that a sensor group corresponding to a sensor category of a sensor category number 3 is a forward camera, a forward radar, and a short-range radar.

That is, it is indicated that the vehicle 53 that includes the sensor group including a forward camera, a forward radar, and a short-range radar is classified into a sensor category indicated by the sensor category number 3.

Although in this way, a sensor category is set according to functions, performances, and types of a sensor group provided for the vehicle 53 and a combination of the functions, the performances, and the types, the sensor category may not be a detailer classification of provided sensors since the sensor category is only required to classify sensing ability provided for the vehicle 53.

For example, if sensors that can perform object recognition that is difficult with a sensor using images, such as a visible-light camera, at night, stormy weather, and the like are provided, one category may be made irrespective of types of the sensors, a sensor category provided with both a sensor that can detect forward objects and a sensor that can detect backward objects, and a sensor category that can detect only forward objects or only backward objects may be each set.

Furthermore, sensor categories may be set into a hierarchy. For example, upper-rank sensor categories may be set according to every purpose irrespective of types of sensors, and lower-rank sensor categories may be set according to every respective sensor provided for vehicles classified into each of the upper-rank sensor categories.

Figure 6:
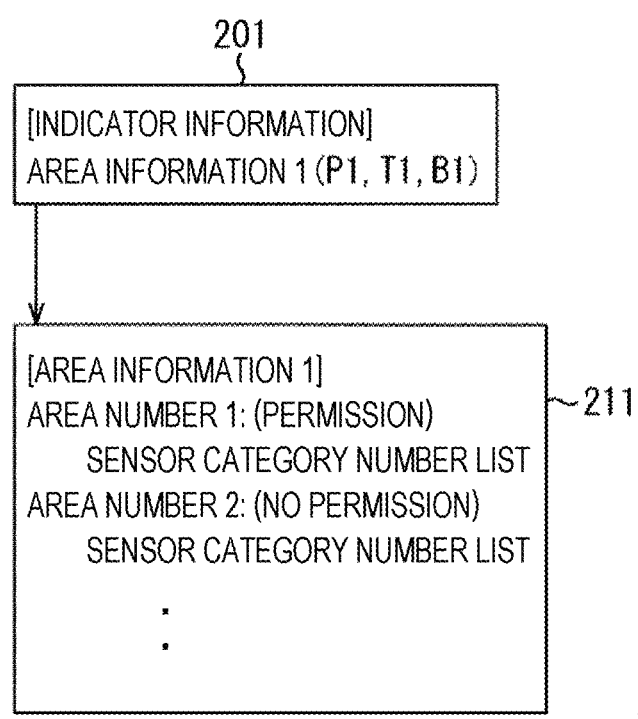
FIG. 6 is a drawing that illustrates an example of indicator information and area information.

For example, a category including sensors that perform object detection at night may be set as an upper-rank sensor category, and according to types of specific sensors, the vehicle 53 including an infrared camera may be set to a first lower-rank sensor category, the vehicle 53 including a radar may be set to a second lower-rank sensor category, and the vehicle 53 including both an infrared camera and a radar may be set to a third lower-rank sensor category Indicator Information and Area Information Next, details of indicator information and area information will be described with reference to FIG. 6.

The indicator information is information necessary to acquire each area information, and is information transmitted at predetermined timings and at a predetermined transmission frequency.

As illustrated in FIG. 6, indicator information 201 includes, for every area information, position information about a wireless base station 52 distributing information, and information indicating a transmission time at which the area information is transmitted, and a transmission frequency at which the area information is transmitted.

More specifically, in the indicator information 201 in FIG. 6, "AREA INFORMATION 1 (P1, T1, B1)" is transcribed, and it is indicated that area information specified by the area information 1 is transmitted from a wireless base station 52 pinpointed by the position information P1, at a transmission time pinpointed by the transmission time T1, and at a transmission frequency indicated by the transmission frequency B1.

If the area information detection unit 144 controls the communication unit 103 to acquire the indicator information, the area information detection unit 144 receives the area information, from the wireless base station 52 pinpointed by the position information P1, at the transmission time pinpointed by the transmission time T1, and at the transmission frequency pinpointed by the transmission frequency B1.

The received area information is, for example, such information indicated by area information 211 in FIG. 6, and includes information that identifies the area information, and information about a sensor category number list that passage is possible (permitted) or a sensor category number list that passage is impossible (not permitted), for every area number.

Here, the area number is a number preliminarily assigned to a street section extracted from map information, or a number that specifies a section on a map constituted by latitude information and longitude information.

In FIG. 6, "AREA INFORMATION 1" at the top row signifies that the information is area information classified by the area information 1.

Furthermore, "AREA NUMBER 1: (PERMISSION)" signifies that a sensor category number list below is a list including sensor category numbers passage of which is possible in roads in an area classified by the area number 1, and for which an attribute indicating that passage is permitted is provided.

Moreover, "AREA NUMBER 2: (NO PERMISSION)" signifies that a sensor category list below is a list including sensor category numbers passage of which is impossible in roads in an area classified by the area number 2, and for which an attribute indicating that passage is not permitted is provided.

If the route planning unit 161 acquires area information received by the area information detection unit 144 and supplied through the state recognition unit 153 and the state prediction unit 154, the route planning unit 161 searches for a sensor category number corresponding to a sensor category of the own car, from sensor category number lists included in the area information, and determines whether or not passage through areas on a planned route is possible.

Then, the route planning unit 161 plans the shortest route from a present position to a destination, and compares the shortest route with an already planned route.

Here, in a case where the shortest route corresponds to the already planned route, the route planning unit 161 determines whether or not there is an area passage through which is made impossible (not permitted) on the already planned route.

Here, when there is an area passage through which is made impossible, the route planning unit 161 replans a route that avoids the area passage through which is made impossible.

Furthermore, in a case where the shortest route from a present position to a destination does not correspond to an already planned route, there is a possibility that the route has been planned in such a manner that an area passage through which has been previously made impossible has been avoided.

Then, in such a case, the route planning unit 161 checks again whether or not there is an area passage through which is impossible, in the planned shortest route. When an area passage through which is impossible does not exist, a planned route is changed to the shortest route.

That is, since an area that has existed on the shortest route and passage through which has been made impossible, at a previous timing may become passable due to a change in the environment, in such a case, the route planning unit 161 replans a route including an area that has been previously avoided.

Due to such processing above, an appropriate route can be planned while critical states are avoided.

<Automatic-Driving Management Processing>

Next, automatic-driving management processing by the traffic control system 41 in FIG. 2 will be described with reference to a flowchart in FIG. 7.

In step S11, the area information management unit 92 in the control unit 71 of the central controller 51 generates area information.

More specifically, the area information management unit 92 determines whether each of sensor categories managed by the sensor category information management unit 91 corresponds to an attribute of permission indicating that passage is possible or corresponds to an attribute of no permission indicating that passage is impossible, on the basis of road information, such as road widths, road surface states, and the like of roads, weather information, and traffic information, of every area, and environment information, such as brightness and the like, at a current time.

Then, on the basis of each of the results, the area information management unit 92 generates, for every area, a sensor category number list associated with an area number and including sensor category numbers corresponding to an attribute of permission or no permission, generates area information described with reference to FIG. 6, and stores the area information in the storage unit 74.

In step S12, the indicator information management unit 93 generates, for every area information, indicator information including position information about the wireless base station 52 distributing the area information, time information indicating timings at which the area information is transmitted, and information about a transmission frequency at which the area information is transmitted, and stores the indicator information in the storage unit 74.

In step S13, the control unit 71 retrieves the area information and the indicator information stored in the storage unit 74, and controls the communication unit 75 to transmit the area information and the indicator information to the wireless base station 52.

In step S14, the control unit 71 determines whether or not it has been instructed to end the processing. In a case where it has not been instructed to end the processing, the processing returns to step S11.

On the other hand, in steps S31 and S51, the area information detection unit 144 of the vehicle 53 searches for the wireless base station 52 by cell search, and establishes a downlink between the vehicle 53 and the wireless base station 52.

That is, since the downlink is established, transmission of data from the wireless base station 52 to the vehicle 53 becomes possible.

In step S32, the wireless base station 52 receives the indicator information and the area information transmitted from the central controller 51.

In step S33, the wireless base station 52 transmits the indicator information, at a transmission time supposed to be already known in the area information detection units 144 of all the vehicles 53, and at a transmission frequency supposed to be already known.

In step S52, the area information detection unit 144 of the vehicle 53 controls the communication unit 103 to receive the indicator information transmitted, at the transmission time supposed to be already known, and at the transmission frequency supposed to be already known. Note that in a case where the indicator information cannot be received in step S52, the provision of services by the traffic control system 41 cannot be received. Therefore, the processing ends.

In step S34, on the basis of the indicator information, the wireless base station 52 transmits area information 1, among information included in the area information, at a transmission time pinpointed by the indicator information, and at a transmission frequency pinpointed by the indicator information.

Accordingly, in step S53, on the basis of the received indicator information, the area information detection unit 144 of the vehicle 53 receives the area information 1, among information included in the area information, at the transmission time pinpointed by the indicator information, and at the transmission frequency pinpointed by the indicator information.

Furthermore, the area information detection unit 144 outputs the received area information 1 to the state recognition unit 153. Moreover, if the state recognition unit 153 acquires the area information 1, the state recognition unit 153 outputs the area information 1 to the state prediction unit 154. Then, if the state prediction unit 154 acquires the area information 1, the state prediction unit 154 outputs the area information 1 to the route planning unit 161 of the planning unit 134. The route planning unit 161 acquires and stores the supplied area information 1.

That is, the area information 1 received by the area information detection unit 144 is supplied to the route planning unit 161 through the state recognition unit 153 and the state prediction unit 154, and stored by the route planning unit 161.

In step S35, on the basis of the indicator information, the wireless base station 52 transmits area information 2, among information included in the area information, at a transmission time pinpointed by the indicator information, and at a transmission frequency pinpointed by the indicator information.

Accordingly, in step S54, on the basis of the received indicator information, the area information detection unit 144 of the vehicle 53 receives the area information 2, among information included in the area information, at the transmission time pinpointed by the indicator information, and at the transmission frequency pinpointed by the indicator information.

That is, the area information 2 received by the area information detection unit 144 is supplied to the route planning unit 161 through the state recognition unit 153 and the state prediction unit 154, and stored by the route planning unit 161.

Thereafter, processing similar to the processing of steps S34 and S53, and the processing of steps S35 and S54 is repeated times corresponding to n of area information 1 to n that constitutes the area information.

Figure 7:
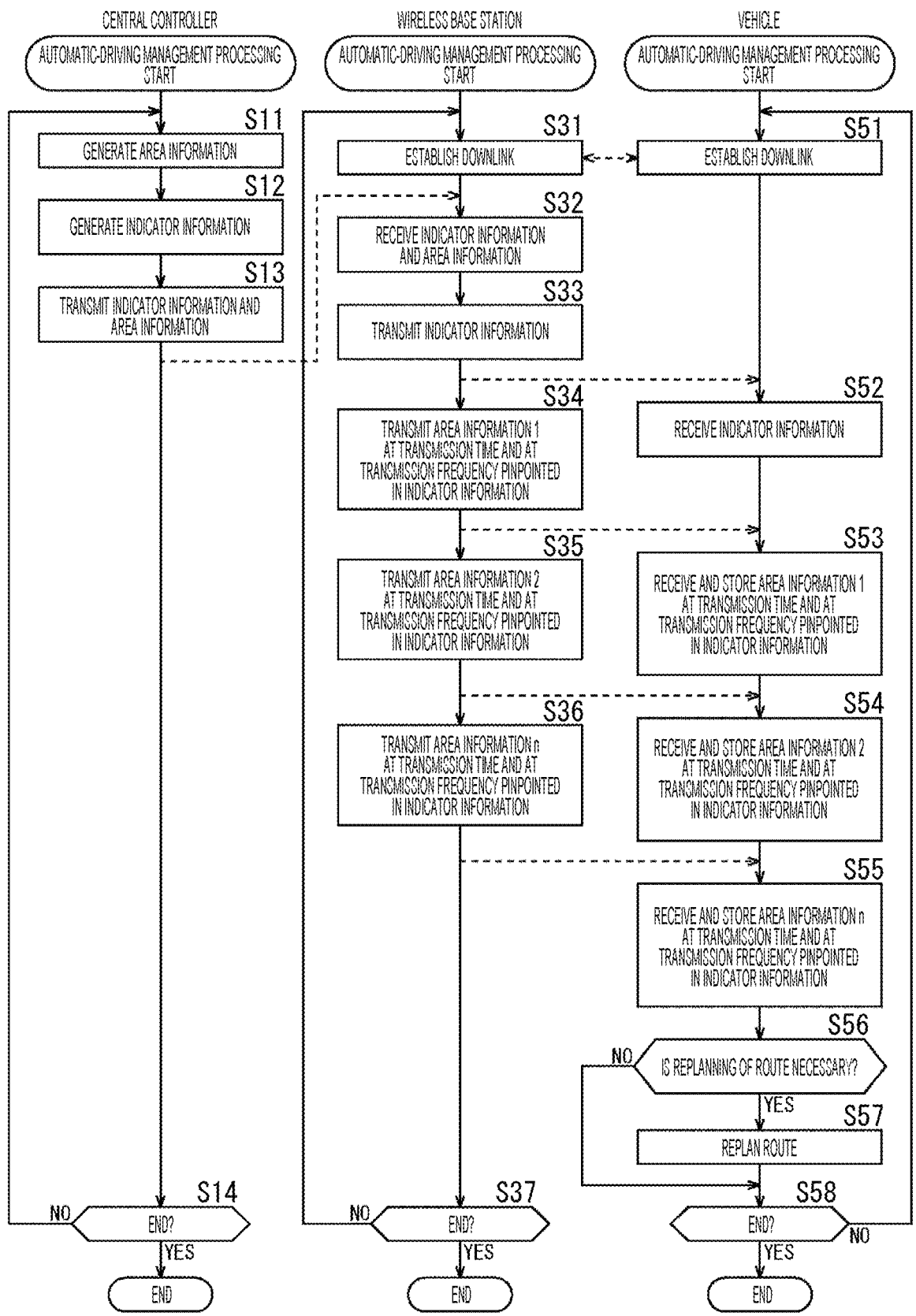
FIG. 7 is a flowchart that illustrates automatic-driving management processing by the traffic control system in FIG. 2.

It is supposed that in FIG. 7, in steps S36 and S55, n-th area information n is transmitted from the wireless base station 52, received by the area information detection unit 144, and supplied to and stored by the route planning unit 161.

In step S37, the wireless base station 52 determines whether or not it has been instructed to end the processing. In a case where it has not been instructed to end the processing, the processing returns to step S31.

That is, in the central controller 51 and the wireless base station 52, area information and indicator information are repeatedly generated in the central controller 51, and continue being distributed to the vehicles 53 through the wireless base station 52, at predetermined time intervals, until it is instructed to end the processing.

Furthermore, it is supposed that due to the processing until this, area information of the area information 1 to n is acquired and stored in the route planning unit 161.

In step S56, on the basis of the stored area information including the area information 1 to n, the route planning unit 161 determines whether or not it is necessary to replan a route planned at present.

That is, for example, as described above, in a case where on the basis of the area information, an area passage through which has been made impossible is included on a route planned as a route to a destination at present, it is determined that the route needs to be replanned.

Alternatively, for example, in a case where a planned route from a current position to a destination is not the shortest route from the current position to the destination, on the basis of the area information, and when an area passage through which has been made impossible is not included on the shortest route from the current position, it is determined that replanning is necessary, as expected, since it is necessary to change the route to return the route to the shortest route.

In step S56, in a case where it is determined that replanning of the route is necessary, the processing proceeds to step S57.

In step S57, the route planning unit 161 replans a route from the current position to the destination, on the basis of the area information, and outputs the route to the action planning unit 162. That is, due to the processing, the route is replanned according to the received area information.

Note that in step S56, in a case where it is determined that replanning of the route is not necessary, the processing of step S57 is skipped.

In step S58, the area information detection unit 144 determines whether or not it has been instructed to end the processing. In a case where it has not been instructed to end the processing, the processing returns to step S51, and the processing after step S51 is repeated.

Then, in step S14, S37, or S58, in a case where it is determined that it has been instructed to end the processing, the processing ends.

That is, due to the above processing, area information and indicator information are repeatedly generated in the central controller 51, and continue being distributed to the vehicles 53 through the wireless base station 52, at predetermined time intervals.

Then, the area information is received in the area information detection unit 144 of the vehicle 53 at the predetermined time intervals, and supplied to the route planning unit 161.

In the route planning unit 161, the area information is received according to a state changing in real time, it is determined whether or not passage is possible for every area, according to a sensor category according to sensors that the own car includes, and a route is replanned according to the determination result.

Therefore, while it is appropriately determined whether or not passage in automatic driving is possible for every area, on the basis of area information generated according to a state changing in real time, a route can be replanned, as necessary, and traveling can be performed.

As a result, while critical states in automatic driving, such as a state where a danger cannot be sufficiently avoided with sensors that the own car includes, a state where automatic driving cannot be continued, and the like, are avoided, automatic driving through the most appropriate route becomes possible.

Variation Example 1 of Area Information and Indicator Information

In the above, an example has been described where area information includes both a sensor category number list associated with an area number, and including sensor category numbers classified into an attribute of permission indicating that passage through roads in a corresponding area is possible, or a sensor category number list associated with an area number, and including sensor category numbers classified into an attribute of no permission indicating that passage through roads in a corresponding area is impossible.

However, since area information is only required to allow the vehicle 53 to recognize that passage through roads in an area corresponding to an area number has been given either an attribute of permission or an attribute of no permission according to a sensor category of the own car, an area number list that specifies corresponding areas may be provided for every sensor category belonging to permission or no permission.

Figure 8:
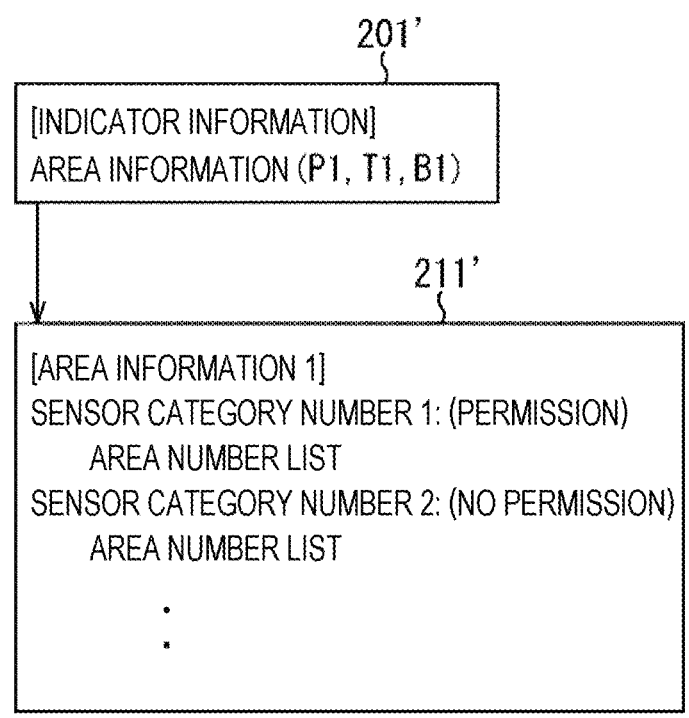
FIG. 8 is a drawing that illustrates Variation Example 1 of indicator information and area information.

That is, as illustrated in area information 211' in FIG. 8, for example, area information may be constituted by an area number list corresponding to a sensor category number 1 classified into an attribute of permission indicating that passage through roads in corresponding areas is possible, and an area number list corresponding to a sensor category number 2 classified into an attribute of no permission indicating that passage through roads in corresponding areas is impossible.

Even also the area information 211' in FIG. 8, the route planning unit 161 retrieves an area number list corresponding to a sensor category number of the own car, determines, according to the presence or absence of an area number corresponding to an area on a planned route, whether or not passage through roads in the corresponding area is possible, and determines, on the basis of the determination result, whether or not replanning of the route is necessary.

Note that the indicator information 201' in FIG. 8 is similar to the indicator information 201 in FIG. 6.

Variation Example 2 of Area Information and Indicator Information

An example has been described where an area number list of every sensor category number classified into an attribute of permission indicating that passage through roads in the areas is possible, and an area number list of every sensor category number classified into an attribute of no permission indicating that passage through roads in the areas is impossible are both included in the above area information.

However, area information including only sensor category number lists including sensor category numbers classified into an attribute of permission indicating that passage through roads in the areas is possible, and area information including only sensor category number lists including sensor category numbers classified into an attribute of no permission indicating that passage through roads in the areas is impossible may be generated, and transmitted as different pieces of area information, at different transmission times, and at different transmission frequencies.

Figure 9:
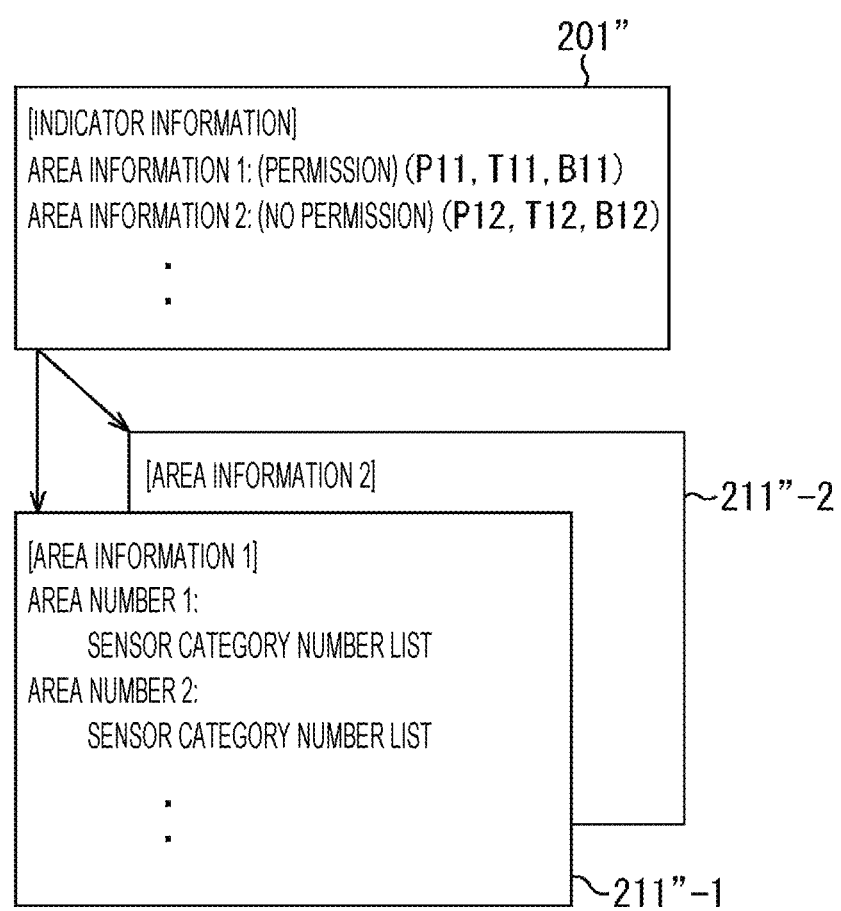
FIG. 9 is a drawing that illustrates Variation Example 2 of indicator information and area information.

That is, as indicated by "AREA INFORMATION 1 (PERMISSION) (P11, T11, B11)" in indicator information 201" in FIG. 9, area information 1 including only sensor category number lists including sensor category numbers classified into an attribute of permission indicating that passage through roads in the areas is possible is set.

Furthermore, as indicated by "AREA INFORMATION 2 (NO PERMISSION) (P12, T12, B12)", area information including only sensor category number lists including sensor category numbers classified into an attribute of no permission indicating that passage through roads in the areas is impossible is set.

Here, as indicated by "(P11, T11, B11)" and "(P12, T12, B12)", it is indicated that the area information 1 and 2 is each transmitted from wireless base stations 52 at different positions (P11, P12), at different transmission times (T11, T12), at different transmission frequencies (B11, B12).

Note that in FIG. 9, an example where all of positions of the wireless base stations 52, the transmission times, and the transmission frequencies are different is illustrated, but at least any of the positions of the wireless base stations 52, the transmission times, and the transmission frequencies are only required to be different.

Then, area information 1 and 2 is transmitted as different pieces of area information, as indicated by area information 211"-1 and 211"-2, respectively.

In this way, area information including only sensor category number lists including sensor category numbers classified into an attribute of permission, and area information including only sensor category number lists including sensor category numbers classified into an attribute of no permission may be set as pieces of area information that are different from each other.

Variation Example 3 of Area Information and Indicator Information

An example has been described where in the above area information, area information including only sensor category number lists including sensor category numbers classified into an attribute of permission indicating that passage through roads in the areas is possible, and area information including only sensor category number lists including sensor category numbers classified into an attribute of no permission indicating that passage through roads in the areas is impossible are generated, and transmitted at different transmission times, and at different transmission frequencies.

However, area information including only area number lists including area numbers of every sensor category number classified into an attribute of permission indicating that passage through roads in the areas is possible, and area information including only area number lists including area numbers of every sensor category number classified into an attribute of no permission indicating that passage through roads in the areas is impossible may be generated, and transmitted at different transmission times, and at different transmission frequencies.

Figure 10:
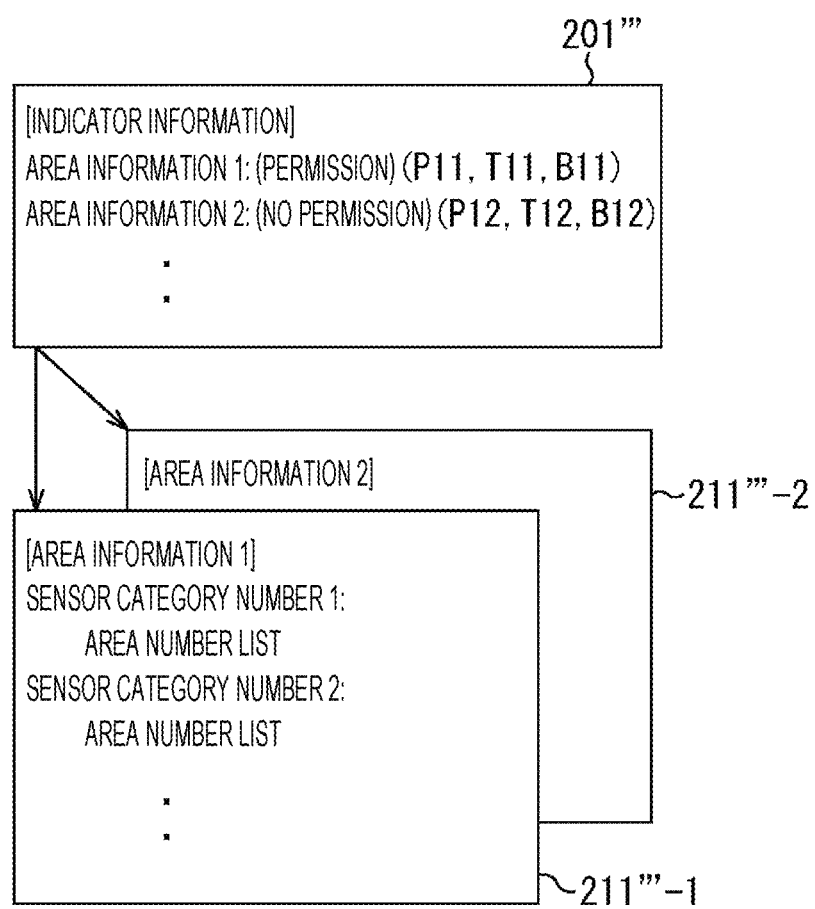
FIG. 10 is a drawing that illustrates Variation Example 3 of indicator information and area information.

That is, as indicated by "AREA INFORMATION 1 (PERMISSION) (P11, T11, B11)'" in indicator information 201'" in FIG. 10, area information 1 including only area number lists including area numbers of every sensor category number classified into an attribute of permission indicating that passage through roads in the areas is possible is set.

Furthermore, as indicated by "AREA INFORMATION 2 (NO PERMISSION) (P12, T12, B12)", area information including only area number lists including area numbers of every sensor category number classified into an attribute of no permission indicating that passage through roads in the areas is impossible is set.

Then, area information 1 and 2 is transmitted as different pieces of area information, as indicated by area information 211'"-1 and 211'"-2, respectively.

In this way, area information including only area number lists including area numbers of every sensor category number classified into an attribute of permission, and area information including only area number lists including area numbers of every sensor category number classified into an attribute of no permission may be set as pieces of area information that are different from each other.

3. Application Example 1 of Automatic-Driving Management Processing

In the above, an example has been described where indicator information and area information are transmitted from the central controller 51 to the wireless base station 52, and the wireless base station 52 transmits the area information to the vehicles 53 at a transmission time and a transmission frequency pinpointed by the indicator information.

However, indicator information may be transmitted from the central controller 51 to the wireless base station 52, and only the indicator information may be transmitted to the vehicles 53. Thereafter, the vehicles 53 and the central controller 51 may establish an uplink through the wireless base station 52, and the central controller 51 may directly transmit area information to the vehicles 53.

Here, with reference to a flowchart of FIG. 11, Application Example 1 of automatic-driving management processing will be described where indicator information is transmitted from the central controller 51 to the wireless base station 52, and only the indicator information is transmitted to the vehicles 53, and thereafter, the vehicles 53 and the central controller 51 establish an uplink through the wireless base station 52, and the central controller 51 directly transmits area information to the vehicles 53.

In step S91, the area information management unit 92 in the control unit 71 of the central controller 51 generates area information.

In step S92, the indicator information management unit 93 generates, for every area information, indicator information including position information about the wireless base station 52 distributing the area information, time information indicating timings at which the area information is transmitted, and information about a transmission frequency at which the area information is transmitted, and stores the indicator information in the storage unit 74.

In step S93, the control unit 71 retrieves the indicator information stored in the storage unit 74, and controls the communication unit 75 to transmit the indicator information to the wireless base station 52.

In steps S111 and S131, the area information detection unit 144 of the vehicle 53 searches for the wireless base station 52 by cell search, and establishes a downlink between the vehicle 53 and the wireless base station 52.

In step S112, the wireless base station 52 receives the indicator information transmitted from the central controller 51.

In step S113, the wireless base station 52 transmits the indicator information, at a transmission time supposed to be already known in the area information detection units 144 of all the vehicles 53, and at a transmission frequency supposed to be already known.

In step S132, the area information detection unit 144 of the vehicle 53 controls the communication unit 103 to receive the indicator information transmitted, at the transmission time supposed to be already known, and at the transmission frequency supposed to be already known.

In steps S94, S114, and S133, the control unit 71 in the central controller 51, the wireless base station 52, and the area information detection unit 144 establish an uplink through the wireless base station 52 in communication of the central controller 51 and the vehicle 53.

Note that hereinafter, with the transcription in the flowchart in FIG. 11 included, the description of processing of the wireless base station 52 will be omitted. However, the central controller 51 and the vehicle 53 directly perform communication by means of the uplink, and the wireless base station 52 relays the communication of the central controller 51 and the vehicle 53, in the condition where the uplink is established.

In step S134, the area information detection unit 144 controls the communication unit 103 to request transmission of the area information from the central controller 51.

In step S95, the area information management unit 92 in the control unit 71 of the central controller 51 notifies to the effect that the transmission of the area information is permitted, as a response to the request from the vehicle 53 for transmission of the area information.

In step S135, the area information detection unit 144 controls the communication unit 103 to receive the notification to the effect that the transmission of the area information transmitted from the central controller 51 is permitted. Note that in a case where the notification to the effect that the transmission of the area information is permitted is not received, the processing ends.

In step S96, on the basis of the indicator information, the area information management unit 92 transmits area information 1, among information included in the area information, at a transmission time pinpointed by the indicator information, and at a transmission frequency pinpointed by the indicator information. Note that the area information management unit 92 controls the wireless base station 52 to adjust a prescribed transmission frequency.

Accordingly, in step S136, on the basis of the received indicator information, the area information detection unit 144 of the vehicle 53 receives the area information 1, among information included in the area information, at the transmission time pinpointed by the indicator information, and at the transmission frequency pinpointed by the indicator information.

Then, the area information 1 received by the area information detection unit 144 is supplied to the route planning unit 161 through the state recognition unit 153 and the state prediction unit 154, and stored by the route planning unit 161.

In step S97, on the basis of the indicator information, the area information management unit 92 transmits area information 2, among information included in the area information, at a transmission time pinpointed by the indicator information, and at a transmission frequency pinpointed by the indicator information.

Accordingly, in step S137, on the basis of the received indicator information, the area information detection unit 144 of the vehicle 53 receives the area information 2, among information included in the area information, at the transmission time pinpointed by the indicator information, and at the transmission frequency pinpointed by the indicator information.

That is, the area information 2 received by the area information detection unit 144 is supplied to the route planning unit 161 through the state recognition unit 153 and the state prediction unit 154, and stored by the route planning unit 161.

Thereafter, processing similar to the processing of steps S96 and S136, and the processing of steps S97 and S137 is repeated times corresponding to n of the area information 1 to n.

Figure 11:
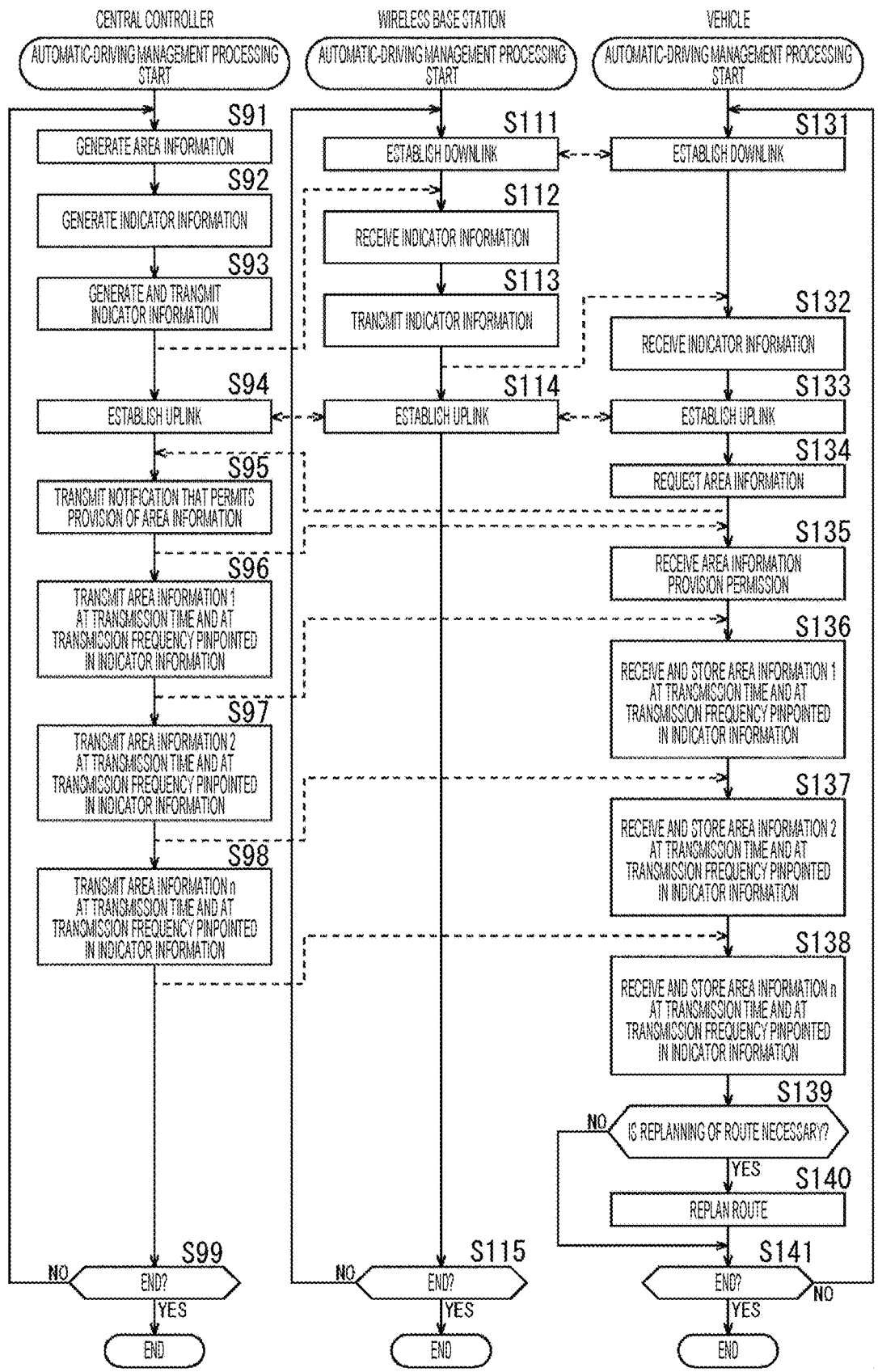
FIG. 11 is a flowchart that illustrates Application Example 1 of automatic-driving management processing by the traffic control system in FIG. 2.

It is supposed that in FIG. 11, in steps S98 and S138, n-th area information n is transmitted from the wireless base station 52, received by the area information detection unit 144, and supplied to and stored by the route planning unit 161.

In step S115, the wireless base station 52 determines whether or not it has been instructed to end the processing. In a case where it has not been instructed to end the processing, the processing returns to step S111.

That is, in the central controller 51 and the wireless base station 52, area information and indicator information are repeatedly generated in the central controller 51, and continue being distributed to the vehicles 53 through the wireless base station 52, at predetermined time intervals, until it is instructed to end the processing.

Furthermore, it is supposed that due to the processing until this, area information of the area information 1 to n is acquired and stored in the route planning unit 161.

In step S139, on the basis of the stored area information including the area information 1 to n, the route planning unit 161 determines whether or not it is necessary to replan a route planned at present.

That is, for example, as described above, in a case where on the basis of the area information, an area passage through which has been made impossible is included on a route planned as a route to a destination at present, it is determined that replanning of the route is necessary.

Alternatively, for example, in a case where a planned route from a current position to a destination is not the shortest route from the current position to the destination, on the basis of the area information, and when an area passage through which has been made impossible is not included on the shortest route from the current position, it is necessary to change the route to return the route to the shortest route, and it is determined that replanning is necessary.

In step S139, in a case where it is determined that replanning to the route is necessary, the processing proceeds to step S140.

In step S140, the route planning unit 161 replans a route from the current position to the destination, on the basis of the area information, and outputs the route to the action planning unit 162. That is, due to the processing, the route is replanned according to the received area information.

Note that in step S139, in a case where it is determined that replanning of the route is not necessary, the processing of step S140 is skipped.

In step S141, the area information detection unit 144 determines whether or not it has been instructed to end the processing. In a case where it has not been instructed to end the processing, the processing returns to step S131, and the processing after step S131 is repeated.

As described above, after the central controller 51 establishes an uplink with the vehicles 53, the central controller 51 may directly distribute area information, instead of the wireless base station 52.

4. Application Example 2 of Automatic-Driving Management Processing

In the above, an example has been described where all area information is distributed to the vehicles 53. However, current position information and information about a present planned route planned to travel from now on may be transmitted from the vehicle 53, and area information about areas near the current position information, and areas on the present planned route planned to travel from now on may be transmitted.

Here, with reference to a flowchart of FIG. 12, Application Example 2 of automatic-driving management processing will be described where current position information and information about a present planned route are transmitted from the vehicle 53, and area information near the current position information and the information about the present planned route is transmitted.

Figure 12:
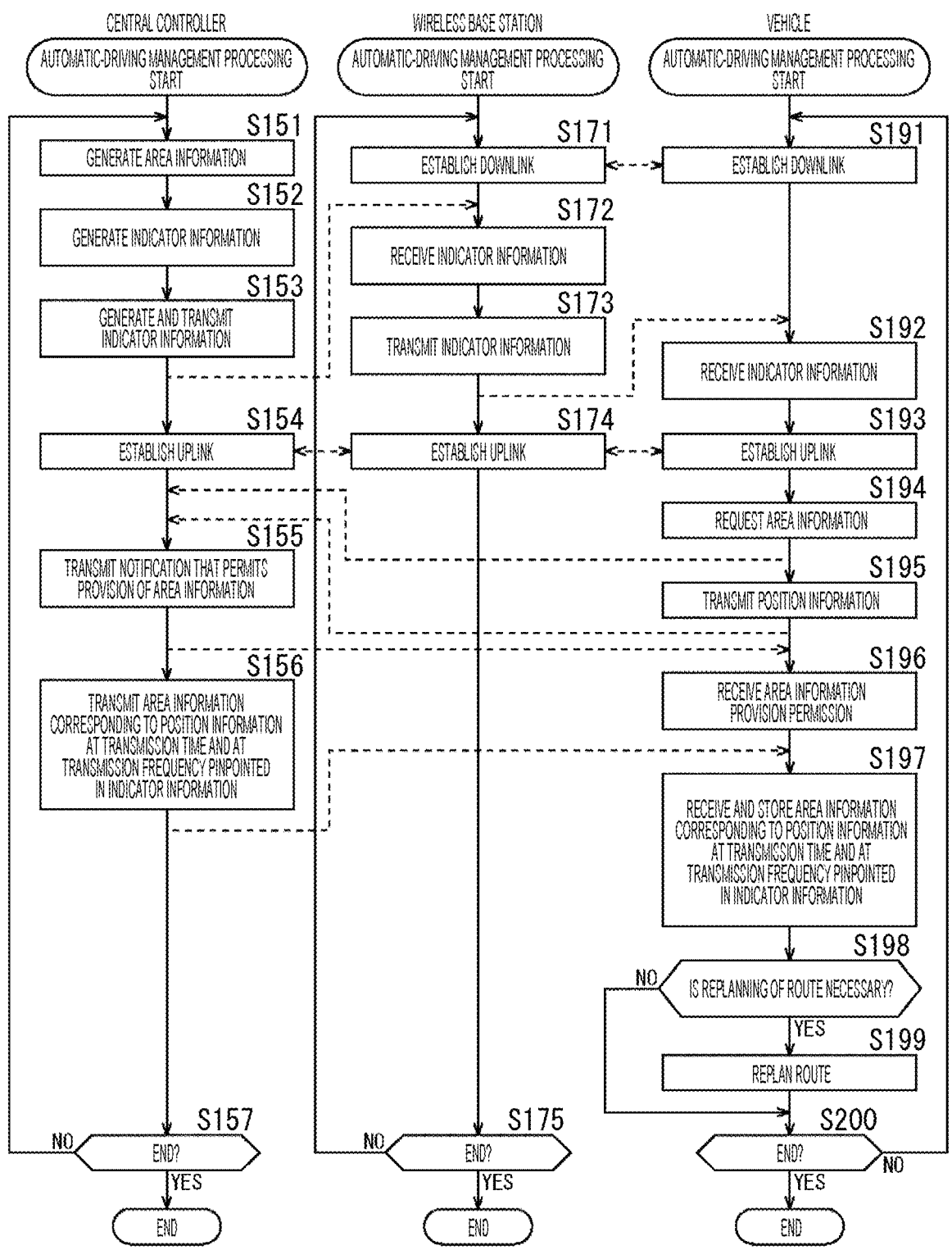
FIG. 12 is a flowchart that illustrates Application Example 2 of automatic-driving management processing by the traffic control system in FIG. 2.

Note that processing of steps S151 to S154, and S157, steps S171 to S175, and steps S191 to S194, and S198 to S200 in the flowchart of FIG. 12 are similar to processing of steps S91 to S94, and S99, steps S111 to S115, and steps S131 to S134, and S139 to S141 in the flowchart of FIG. 11, and therefore will be appropriately omitted.

That is, in step S194, transmission of area information is requested from the central controller 51, and then, in step S195, the area information detection unit 144 controls the communication unit 103 to transmit, to the central controller 51, current position information and information about a route planned at present and expected to travel from now on.

In step S155, the area information management unit 92 in the control unit 71 of the central controller 51 notifies to the effect that the transmission of the area information is permitted, as a response to the request from the vehicle 53 for transmission of the area information.

In step S196, the area information detection unit 144 controls the communication unit 103 to receive the notification to the effect that the transmission of the area information transmitted from the central controller 51 is permitted.

In step S156, on the basis of indicator information, the area information management unit 92 transmits, among information included in area information, area information about areas corresponding to the position information and the information about a route planned at present and expected to travel from now on, transmitted from the vehicle 53, at a transmission time pinpointed by the indicator information, and at a transmission frequency pinpointed by the indicator information.

In step S197, on the basis of the received indicator information, the area information detection unit 144 of the vehicle 53 receives, among information included in area information, the area information about areas corresponding to the position information and the information about a route planned at present and expected to travel from now on, of the vehicle 53 itself, at the transmission time pinpointed by the indicator information, and at the transmission frequency pinpointed by the indicator information.

Then, the area information about areas corresponding to the position information and the information about a route planned at present and expected to travel from now on, of the vehicle 53 itself, received by the area information detection unit 144, is supplied to the route planning unit 161 through the state recognition unit 153 and the state prediction unit 154, and stored by the route planning unit 161.

That is, in the central controller 51 and the wireless base station 52, area information about areas corresponding to the position information and the information about a route planned at present and expected to travel from now on, of the vehicle 53, is repeatedly generated in the central controller 51, and continues being distributed to the vehicle 53 through the wireless base station 52, at predetermined time intervals, until it is instructed to end the processing.

Furthermore, due to the processing until this, the area information about areas corresponding to the now current position information and the information about a route planned at present and expected to travel from now on is acquired and stored in the route planning unit 161.

In step S198, on the basis of the stored area information corresponding to the current position information and the information about a route planned at present and expected to travel from now on, the route planning unit 161 determines whether or not replanning to the route planned at present is necessary.

Due to the above processing, the vehicle 53 acquires the area information corresponding to the position information and the information about a route planned at present and expected to travel from now on, of the vehicle 53 itself, and determines whether or not a change to the route planned at present is necessary, and a route is replanned according to the necessity.

As a result, only communicating the necessary smallest area information with the central controller 51 allows realizing automatic driving through an appropriate route while avoiding critical states.

5. Application Example 3 of Automatic-Driving Management Processing

In the above, an example has been described where current position information is transmitted from the vehicle 53, and area information near the current position information and a route planned at present and expected to travel from now on is transmitted. However, a sensor category number of the vehicle 53 itself may be transmitted from the vehicle 53, and area information corresponding to a sensor category may be transmitted.

Here, with reference to a flowchart of FIG. 13, Application Example 3 of automatic-driving management processing will be described where a sensor category of the own car is transmitted from the vehicle 53, and area information corresponding to the sensor category of the own car is transmitted.

Figure 13:
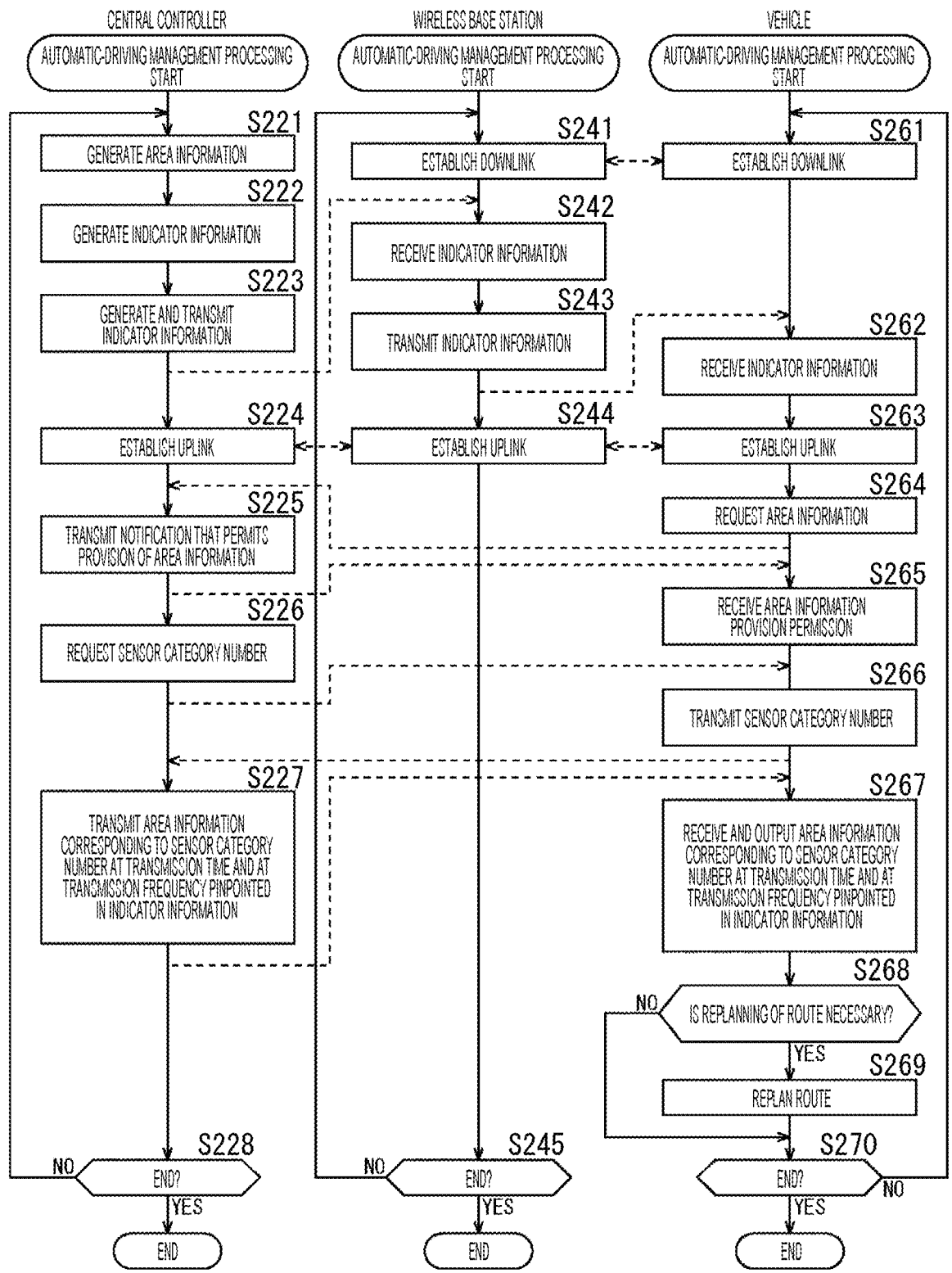
FIG. 13 is a flowchart that illustrates Application Example 3 of automatic-driving management processing by the traffic control system in FIG. 2.

Note that processing of steps S221 to S224, and S228, steps S241 to S245, and steps S261 to S264, and S268 to S270 in the flowchart of FIG. 13 are similar to processing of steps S151 to S154, and S157, steps S171 to S175, and steps S191 to S194, and S198 to S200 in the flowchart of FIG. 12, and therefore will be appropriately omitted.

That is, in step S264, transmission of area information is requested from the central controller 51, and then, in step S225, the area information management unit 92 in the control unit 71 of the central controller 51 notifies to the effect that the transmission of the area information is permitted, as a response to the request from the vehicle 53 for transmission of the area information.

In step S265, the area information detection unit 144 controls the communication unit 103 to receive the notification to the effect that the transmission of the area information transmitted from the central controller 51 is permitted.

In step S226, the area information management unit 92 requests information about a sensor category number from the vehicle 53.

In step S266, the area information detection unit 144 of the vehicle 53 transmits a sensor category number indicating a sensor category of the own car to the central controller 51.

In step S227, on the basis of indicator information, the area information management unit 92 transmits, among information included in area information, area information corresponding to the sensor category number transmitted from the vehicle 53, at a transmission time pinpointed in the indicator information, and at a transmission frequency pinpointed in the indicator information.

In step S267, on the basis of the received indicator information, the area information detection unit 144 of the vehicle 53 receives, among information included in area information, the area information corresponding to the sensor category number of the vehicle 53 itself, at the transmission time pinpointed in the indicator information, and at the transmission frequency pinpointed in the indicator information.

Then, the area information received by the area information detection unit 144 and about areas corresponding to position information of the vehicle 53 itself is supplied to the route planning unit 161 through the state recognition unit 153 and the state prediction unit 154, and stored by the route planning unit 161.

Due to the processing until this, the area information corresponding to the sensor category number of the own car is acquired and stored in the route planning unit 161.

In step S268, on the basis of the stored area information corresponding to the sensor category number of the own car, the route planning unit 161 determines whether or not replanning of a route planned at present is necessary.

Due to the above processing, the vehicle 53 acquires only the area information corresponding to the sensor category number of the own car, and determines whether or not replanning of a route planned at present is necessary, and a route is replanned according to the necessity.

As a result, communication of area information with the central controller 51 is only communication corresponding to the sensor category number of the vehicle 53 itself, and automatic driving through an appropriate route can be realized while critical states are avoided.

6. Example Executed by Software

Incidentally, the series of processing described above can be executed by hardware, and can be also executed by software. In a case where the series of processing is executed by software, programs constituting the software are installed, from a recording medium, into a computer incorporated into dedicated hardware, or, for example, a general-purpose computer that can execute various functions due to various programs installed into the general-purpose computer, or the like.

Figure 14:
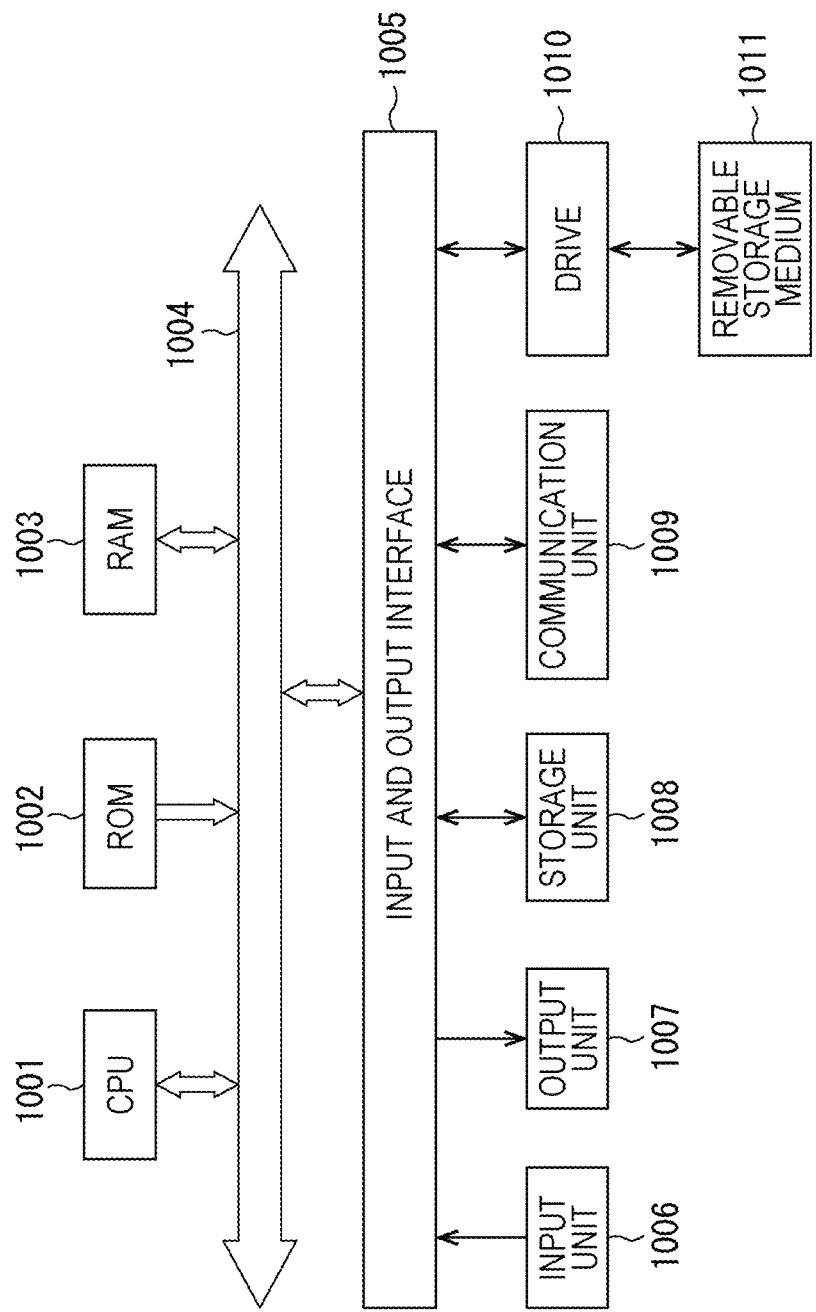
FIG. 14 is a drawing that illustrates a configuration example of a general-purpose computer.

FIG. 14 illustrates a configuration example of a general-purpose computer. The personal computer contains a central processing unit (CPU) 1001. An input and output interface 1005 is connected to the CPU 1001 through a bus 1004. A read only memory (ROM) 1002 and a random access memory (RAM) 1003 are connected to the bus 1004.

Connected to the input and output interface 1005 are an input unit 1006 including input devices into which a user inputs operation commands, such as a keyboard, a mouse, and the like, an output unit 1007 outputting processing operation displays and images of processing results to a display device, a storage unit 1008 storing programs and various data and including a hard disk drive and the like, and a communication unit 1009 including a local area network (LAN) adapter and the like and executing communication processing through a network represented by the Internet. Furthermore, connected to the input and output interface 1005 is a drive 1010 that writes and reads data to and from a removable medium 1011, such as a magnetic disk (including a flexible disk), an optical disc (including a compact disc-read only memory (CD-ROM) and a digital versatile disc (DVD)), a magneto-optical disc (including a Mini Disc (MD)), a semiconductor memory, or the like.

The CPU 1001 executes various processing according to programs stored in the ROM 1002, or programs retrieved from the removable medium 1011, such as a magnetic disk, an optical disc, a magneto-optical disc, a semiconductor memory, or the like, installed into the storage unit 1008, and loaded into the RAM 1003 from the storage unit 1008. Data and the like that the CPU 1001 needs to execute various processing are also appropriately stored in the RAM 1003.

In the computer constituted as described above, the series of processing described above is performed by the CPU 1001, for example, loading programs stored in the storage unit 1008 into the RAM 1003 through the input and output interface 1005 and the bus 1004, and executing the programs.

The programs executed by the computer (CPU 1001), for example, can be recorded in the removable medium 1011 as a package medium or the like, and provided. Alternatively, the programs can be provided through a wired or wireless transmission medium, such as a local area network, the Internet, or digital satellite broadcasting.

In the computer, the programs can be installed into the storage unit 1008 through the input and output interface 1005 by loading the removable medium 1011 into the drive 1010. Alternatively, the programs can be received by the communication unit 1009 through a wired or wireless transmission medium, and installed into the storage unit 1008. Alternatively, the programs can be preliminarily installed into the ROM 1002 or the storage unit 1008.

Note that the programs executed by the computer may be programs according to which the processing is performed in the order described in the present description in a time series, may be programs according to which the processing is performed in parallel, or may be programs according to which the processing is performed at necessary timings that are a time at which a program is called, and the like Note that the CPU 1001 in FIG. 14 realizes the functions of the area information detection unit 144 in FIG. 4. Furthermore, the storage unit 1008 in FIG. 14 realizes the storage unit 111 in FIG. 3.

Furthermore, in the present description, a system means a group of a plurality of constituents (apparatuses, modules (components), and the like), and it does not matter whether or not all the constituents are in the same housing. Therefore, a plurality of apparatuses accommodated in separate housings and connected through a network, and one apparatus that includes a plurality of modules accommodated in one housing are each a system.

Note that exemplary embodiments of the present disclosure are not limited to the exemplary embodiments described above, but various modifications are possible within a scope that does not depart from the spirit of the present disclosure.

For example, the present disclosure can be configured as cloud computing in which one function is shared and cooperatively processed by a plurality of apparatuses through a network.

Furthermore, each of the steps described in the flowcharts described above can be executed by one apparatus, or shared and executed by a plurality of apparatuses.

Moreover, in a case where a plurality of pieces of processing is included in one step, the plurality of pieces of processing included in the one step can be executed by one apparatus, or shared and executed by a plurality of apparatuses.

Note that the present disclosure can be configured as follows:

<1> An information processing apparatus including:
  an acquisition unit that acquires traveling possibility or impossibility information set on the basis of sensor categories set on the basis of sensors with which vehicles are equipped, and a path of every area; and
  a determination unit that determines whether or not a route to a destination is most appropriate, on the basis of the sensor category of an own car, and the traveling possibility or impossibility information.

<2> The information processing apparatus according to <1>, in which the traveling possibility or impossibility information is set on the basis of road information, weather information, and traffic information of every one of the areas, and environment information, and the sensor categories.

<3> The information processing apparatus according to <1>, in which the traveling possibility or impossibility information includes:
  a permission sensor category number list that includes a list of sensor category numbers that specifies, for every one of the areas, the sensor categories for which an attribute that indicates permission of traveling is provided; and
  a no-permission sensor category number list that includes a list of sensor category numbers that specifies, for every one of the areas, the sensor categories for which an attribute that indicates no permission of traveling is provided.

<4> The information processing apparatus according to <1>, in which the traveling possibility or impossibility information includes:
  a permission area number list that includes a list of area numbers that specifies, for every one of the sensor categories, the areas for which an attribute that indicates permission of traveling is provided; and
  a no-permission area number list that includes a list of area numbers that specifies, for every one of the sensor categories, the areas for which an attribute that indicates no permission of traveling is provided.

<5> The information processing apparatus according to <1>, in which the traveling possibility or impossibility information includes:
  first traveling possibility or impossibility information that includes a permission sensor category number list that includes a list of sensor category numbers that specifies, for every one of the areas, the sensor categories for which an attribute that indicates permission of traveling is provided; and second traveling possibility or impossibility information that includes a no-permission sensor category number list that includes a list of sensor category numbers that specifies, for every one of the areas, the sensor categories for which an attribute that indicates no permission of traveling is provided.

<6> The information processing apparatus according to <1>, in which the traveling possibility or impossibility information includes:
first traveling possibility or impossibility information that includes a permission area number list that includes a list of area numbers that specifies, for every one of the sensor categories, the areas for which an attribute that indicates permission of traveling is provided; and
second traveling possibility or impossibility information that includes a no-permission area number list that includes a list of area numbers that specifies, for every one of the sensor categories, the areas for which an attribute that indicates no permission of traveling is provided.

<7> The information processing apparatus according to any of <1> to <6>,
in which the acquisition unit further acquires acquisition information for acquiring the traveling possibility or impossibility information, and acquires the traveling possibility or impossibility information, on the basis of the acquisition information.

<8> The information processing apparatus according to <7>,
in which the acquisition information includes information about a transmission time at which the traveling possibility or impossibility information is transmitted, and a transmission frequency at which the traveling possibility or impossibility information is transmitted, and
the acquisition unit acquires the traveling possibility or impossibility information at the transmission time at which the traveling possibility or impossibility information is transmitted, and at the transmission frequency at which the traveling possibility or impossibility information is transmitted, based on the acquisition information.

<9> The information processing apparatus according to any of <1> to <8>,
in which in a case where the determination unit determines that a present route to the destination is not most appropriate, the determination unit replans a route to the destination, on the basis of the traveling possibility or impossibility information.

<10> The information processing apparatus according to <9>,
in which on the basis of the traveling possibility or impossibility information, the determination unit avoids a path of the areas traveling through which is not permitted, and replans a route to the destination by means of a path of the areas traveling through which is permitted.

<11> The information processing apparatus according to <9>,
in which on the basis of the traveling possibility or impossibility information, the determination unit replans at least any of a shortest route, a route with best fuel efficiency, or a safest route, as the route to the destination.

<12> The information processing apparatus according to any of <1> to <11>, further including
a transmission unit that transmits information about at least any of a current position of the own car, or a present route to the destination,
in which among the traveling possibility or impossibility information of every one of the sensor categories set on the basis of the sensors with which the vehicles are equipped, of a path of every one of the areas, the acquisition unit acquires the traveling possibility or impossibility information that corresponds to at least any of the current position of the own car, or the present route to the destination.

<13> The information processing apparatus according to any of <1> to <11>, further including
a transmission unit that transmits information that specifies the sensor category of the own car,
in which the acquisition unit acquires the traveling possibility or impossibility information that corresponds to the sensor category of the own car.

<14> The information processing apparatus according to any of <1> to <13>,
in which the sensor categories are set on the basis of performances, functions, and types of the sensors with which the vehicles are equipped, and combinations of the performances, the functions, and the types.

<15> The information processing apparatus according to <14>,
in which the sensor categories are hierarchically set on the basis of the performances, the functions, and the types of the sensors with which the vehicles are equipped, and the combinations of the performances, the functions, and the types.

<16> An information processing method including:
acquisition processing of acquiring traveling possibility or impossibility information set on the basis of sensor categories set on the basis of sensors with which vehicles are equipped, and a path of every area; and
determination processing of determining whether or not a route to a destination is most appropriate, on the basis of the sensor category of an own car, and the traveling possibility or impossibility information.

<17> A program that makes a computer function as:
an acquisition unit that acquires traveling possibility or impossibility information set on the basis of sensor categories set on the basis of sensors with which vehicles are equipped, and a path of every area; and
a determination unit that determines whether or not a route to a destination is most appropriate, on the basis of the sensor category of an own car, and the traveling possibility or impossibility information.

REFERENCE SIGNS LIST

41 Traffic control system
51 Central controller
52 Wireless base station
53
53-1 to 53-n Vehicle
71 Control unit
91 Sensor category information management unit
92 Area information management unit
93 Indicator information management unit
131 Detection unit
144 Area information detection unit

The invention claimed is:
1. An information processing apparatus comprising:
a circuitry configured to
acquire traveling possibility or impossibility information set on a basis of sensor categories set on a basis of sensors with which vehicles are equipped, and routes to a destination of travel; and determine whether or not a route to the destination is best, on a basis of the sensor category of an own car, and the traveling possibility or impossibility information, wherein the sensor categories are set on a basis of performances, functions, and types of the sensors with which the vehicles are equipped, and combinations of the performances, the functions, and the types, and the sensor categories are hierarchically set on a basis of the performances, the functions, and the types of the sensors with which the vehicles are equipped, and the combinations of the performances, the functions, and the types, and the types of the sensors include an infrared camera for object detection at night; and a transmitter that transmits information that specifies the sensor category of the own car, wherein the circuitry acquires the traveling possibility or impossibility information that corresponds to the sensor category of the own car.

2. The information processing apparatus according to claim 1, wherein the traveling possibility or impossibility information is set on a basis of road information, weather information, traffic information of the routes to the destination of travel, environment information, and the sensor categories.

3. The information processing apparatus according to claim 1, wherein the traveling possibility or impossibility information includes:

a permission sensor category number list that includes a list of sensor category numbers that specifies, for every one of the routes to the destination of travel, the sensor categories for which an attribute that indicates permission of traveling is provided; and a no-permission sensor category number list that includes a list of sensor category numbers that specifies, for every one of the routes to the destination of travel, the sensor categories for which an attribute that indicates no permission of traveling is provided.

4. The information processing apparatus according to claim 1, wherein the traveling possibility or impossibility information includes:

a permission area number list that includes a list of area numbers that specifies, for every one of the sensor categories, the routes to the destination of travel for which an attribute that indicates permission of traveling is provided; and a no-permission area number list that includes a list of area numbers that specifies, for every one of the sensor categories, the routes to the destination of travel for which an attribute that indicates no permission of traveling is provided.

5. The information processing apparatus according to claim 1, wherein the traveling possibility or impossibility information includes:

first traveling possibility or impossibility information that includes a permission sensor category number list that includes a list of sensor category numbers that specifies, for every one of the routes to the destination of travel, the sensor categories for which an attribute that indicates permission of traveling is provided; and second traveling possibility or impossibility information that includes a no-permission sensor category number list that includes a list of sensor category numbers that specifies, for every one of the routes to the destination of travel, the sensor categories for which an attribute that indicates no permission of traveling is provided.

6. The information processing apparatus according to claim 1, wherein the traveling possibility or impossibility information includes:

first traveling possibility or impossibility information that includes a permission area number list that includes a list of area numbers that specifies, for every one of the sensor categories, the routes to the destination of travel for which an attribute that indicates permission of traveling is provided; and second traveling possibility or impossibility information that includes a no-permission area number list that includes a list of area numbers that specifies, for every one of the sensor categories, the routes to the destination of travel for which an attribute that indicates no permission of traveling is provided.

7. The information processing apparatus according to claim 1, wherein the circuitry acquires acquisition information for acquiring the traveling possibility or impossibility information, and acquires the traveling possibility or impossibility information, on a basis of the acquisition information.

8. The information processing apparatus according to claim 7, wherein the acquisition information includes information about a transmission time at which the traveling possibility or impossibility information is transmitted, and a transmission frequency at which the traveling possibility or impossibility information is transmitted, and the circuitry acquires the traveling possibility or impossibility information at the transmission time at which the traveling possibility or impossibility information is transmitted, and at the transmission frequency at which the traveling possibility or impossibility information is transmitted, based on the acquisition information.

9. The information processing apparatus according to claim 1, wherein in a case where the circuitry determines that a present route to the destination is not best, the circuitry replans a route to the destination, on a basis of the traveling possibility or impossibility information.

10. The information processing apparatus according to claim 9, wherein on a basis of the traveling possibility or impossibility information, the circuitry avoids a path of the routes to the destination of travel traveling through which is not permitted, and replans a route to the destination by a path of the routes to the destination of travel traveling through which is permitted.

11. The information processing apparatus according to claim 9, wherein on a basis of the traveling possibility or impossibility information, the circuitry replans at least any of a shortest route, a route with best fuel efficiency, or a safest route, as the route to the destination.

12. The information processing apparatus according to claim 1, further comprising the transmitter transmits information about at least any of a current position of the own car, or a present route to the destination, wherein among the traveling possibility or impossibility information of every one of the sensor categories set on a basis of the sensors with which the vehicles are equipped, of every one of the routes to the destination of travel, the circuitry acquires the traveling possibility or impossibility information that corresponds to at least any of the current position of the own car, or the present route to the destination.

13. An information processing method comprising:
acquiring traveling possibility or impossibility information set on a basis of sensor categories set on a basis of sensors with which vehicles are equipped, and routes to a destination of travel; and
determining whether or not a route to the destination is best, on a basis of the sensor category of an own car, and the traveling possibility or impossibility information,
wherein the sensor categories are set on a basis of performances, functions, and types of the sensors with which the vehicles are equipped, and combinations of the performances, the functions, and the types, and the sensor categories are hierarchically set on a basis of the performances, the functions, and the types of the sensors with which the vehicles are equipped, and the combinations of the performances, the functions, and the types, and the types of the sensors include an infrared camera for object detection at night; and
transmitting, by a transmitter, information that specifies the sensor category of the own car,
wherein a circuitry acquires the traveling possibility or impossibility information that corresponds to the sensor category of the own car.

14. A non-transitory computer-readable storage medium storing executable instructions, which when executed a circuitry, cause the circuitry to perform a method comprising:
acquiring traveling possibility or impossibility information set on a basis of sensor categories set on a basis of sensors with which vehicles are equipped, and routes to a destination of travel; and
determining whether or not a route to the destination is best, on a basis of the sensor category of an own car, and the traveling possibility or impossibility information,
wherein the sensor categories are set on a basis of performances, functions, and types of the sensors with which the vehicles are equipped, and combinations of the performances, the functions, and the types, and the sensor categories are hierarchically set on a basis of the performances, the functions, and the types of the sensors with which the vehicles are equipped, and the combinations of the performances, the functions, and the types, and the types of the sensors include an infrared camera for object detection at night; and
a transmitter that transmits information that specifies the sensor category of the own car,
wherein the circuitry acquires the traveling possibility or impossibility information that corresponds to the sensor category of the own car.

* * * * *